(12) United States Patent
Sakata

(10) Patent No.: US 12,461,436 B2
(45) Date of Patent: Nov. 4, 2025

(54) PROJECTOR

(71) Applicant: SEIKO EPSON CORPORATION, Tokyo (JP)

(72) Inventor: Hidefumi Sakata, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 407 days.

(21) Appl. No.: 18/191,068

(22) Filed: Mar. 28, 2023

(65) Prior Publication Data

US 2023/0305378 A1    Sep. 28, 2023

(30) Foreign Application Priority Data

Mar. 28, 2022   (JP) ................. 2022-051312

(51) Int. Cl.
   *G03B 21/20*   (2006.01)

(52) U.S. Cl.
   CPC ....... *G03B 21/204* (2013.01); *G03B 21/2066* (2013.01); *G03B 21/208* (2013.01)

(58) Field of Classification Search
   None
   See application file for complete search history.

(56) References Cited

U.S. PATENT DOCUMENTS

| | | | |
|---|---|---|---|
| 2008/0174742 A1 | 7/2008 | Ito | |
| 2010/0118411 A1 | 5/2010 | Nakajima | |
| 2014/0375958 A1 | 12/2014 | Kuwata et al. | |
| 2016/0266297 A1* | 9/2016 | Hikmet | G02B 26/008 |
| 2019/0082151 A1 | 3/2019 | Kishimoto | |
| 2021/0294201 A1 | 9/2021 | Suzuki et al. | |

FOREIGN PATENT DOCUMENTS

| | | |
|---|---|---|
| JP | 2008-176195 A | 7/2008 |
| JP | 2011-039395 A | 2/2011 |
| JP | 2017-147420 A | 8/2017 |
| JP | 2021-149021 A | 9/2021 |
| JP | 2021-152632 A | 9/2021 |
| WO | WO2009/020014 A | 2/2009 |
| WO | WO2013/114665 A | 8/2013 |
| WO | WO2017145400 A | 8/2017 |

* cited by examiner

*Primary Examiner* — Bao-Luan Q Le
*Assistant Examiner* — Danell L Owens
(74) *Attorney, Agent, or Firm* — Dority & Manning, P.A.

(57) ABSTRACT

A projector according to the present disclosure is a projector configured to project an image on a projection target in a focus-free state, including a first light source device, and a light modulation element configured to modulate light emitted from the first light source device. The first light source device includes a light emitting element configured to emit first light having a first wavelength band, a wavelength conversion member which includes a phosphor, and which is configured to convert the first light emitted from the light emitting element into second light having a second wavelength band, and an exit part which is disposed along a central axis of the wavelength conversion member, and which is configured to emit the second light generated by the wavelength conversion member.

18 Claims, 13 Drawing Sheets

PROJECTOR

The present application is based on, and claims priority from JP Application Serial Number 2022-051312, filed Mar. 28, 2022, the disclosure of which is hereby incorporated by reference herein in its entirety.

BACKGROUND

1. Technical Field

The present disclosure relates to a projector.

2. Related Art

A related-art projector requires a focusing operation of an image by adjusting a focal distance in a projection optical system every time a distance from, for example, the projector to a screen is changed. To cope with the above, there is proposed a projector which does not require the focusing operation of the image. As an example of the projector of this kind, International Patent Publication No. WO 2017/145400 (Document 1) discloses a projector provided with a transmissive spatial light modulator, and a laser source for emitting a laser beam with which the spatial light modulator is irradiated.

In Document 1, there is described that in this projector, a light beam emitted from each of pixels of the spatial light modulator is formed of a laser beam, and has a high directionality, and therefore, even when a distance from the projector to the screen varies, there is no chance for a blur of the image due to defocus to occur. However, in the projector in Document 1, since the projection light is high in coherence, the light scattered by the screen interferes each other to generate a speckle noise. Therefore, the projection image locally glares, and thus there is a problem that the display quality deteriorates.

SUMMARY

In view of the problems described above, a projector according to the aspect of the present disclosure is a projector configured to project an image on a projection target in a focus-free state, including a first light source device, and a light modulation element configured to modulate light emitted from the first light source device. The first light source device includes a light emitting element configured to emit first light having a first wavelength band, a wavelength conversion member which includes a phosphor, and which is configured to convert the first light emitted from the light emitting element into second light having a second wavelength band different from the first wavelength band, and an exit part which is disposed along a central axis of the wavelength conversion member, and which is configured to emit the second light generated by the wavelength conversion member. The exit part has a first end part opposed to the wavelength conversion member, a second end part located at an opposite side to the first end part along the central axis, and a taper part gradually decreasing in cross-sectional area perpendicular to the central axis in a direction from the first end part toward the second end part. The taper part has a light exit surface which is tilted with respect to the central axis, and which is configured to emit the second light.

DESCRIPTION OF EXEMPLARY EMBODIMENTS

First Embodiment

Figure 1:
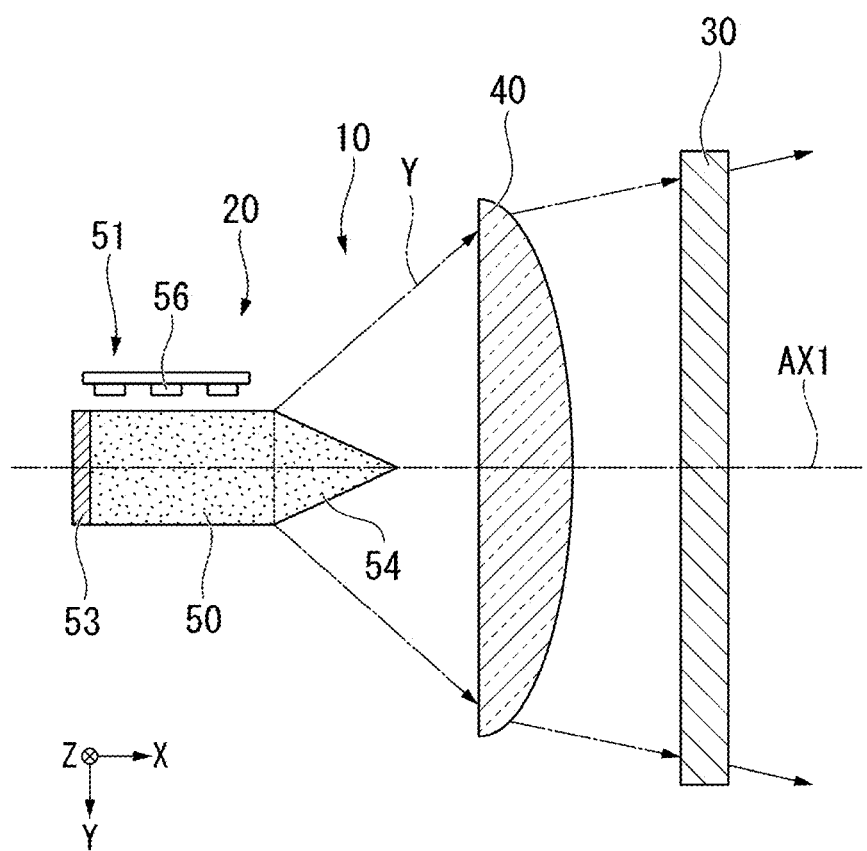
FIG. 1 is a schematic configuration diagram of a projector according to a first embodiment.

A first embodiment of the present disclosure will hereinafter be described using the drawings.

A projector according to the present embodiment is an example of a projector using liquid crystal panels as light modulation elements.

In the drawings described below, constituents are shown with respective dimensional scale ratios different from each other in some cases in order to make the constituents eye-friendly.

FIG. 1 is a diagram showing a schematic configuration of a projector 10 according to the present embodiment.

As shown in FIG. 1, the projector 10 according to the present embodiment is provided with a first light source device 20, a light modulation element 30, and an angle conversion lens 40. The projector 10 projects an arbitrary image on a projection target in a focus-free state. The projection target is a medium on which the image generated by the projector 10 is projected, and includes, for example, a screen, a wall, glass, a desk, a building, and an aggregate of water droplets or powder particles. Further, the image includes, for example, a character, a picture, a symbol, a pattern, and a coded pattern such as a two-dimensional bar-code.

In the present specification, a focus-free projector means a projector which does not have an imaging optics for imaging an image of the light modulation element on the projection target, and a projector which does not require a focusing operation of a projection image even when the distance from, for example, the projector to the screen varies. In the projector 10 according to the present embodiment, since there is provided the first light source device 20 for emitting the fluorescence Y from an exit part 54 extremely small in size as described later, there is no chance for light beams having passed through a plurality of pixels of the light modulation element 30 to be mixed with each other, and thus, it is possible to project the image focused on the projection target without using the imaging optics.

Hereinafter, in the drawings, the explanation will be presented using an XYZ orthogonal coordinate system as needed. An X axis is an axis parallel to an optical axis AX1 of the first light source device 20. The optical axis AX1 of the first light source device 20 is a central axis of the fluorescence Y emitted from the first light source device 20. A Y axis is an axis along a direction in which a wavelength conversion member 50 and a light source 51 are arranged. A Z axis is an axis perpendicular to the X axis and the Y axis.

Figure 2:
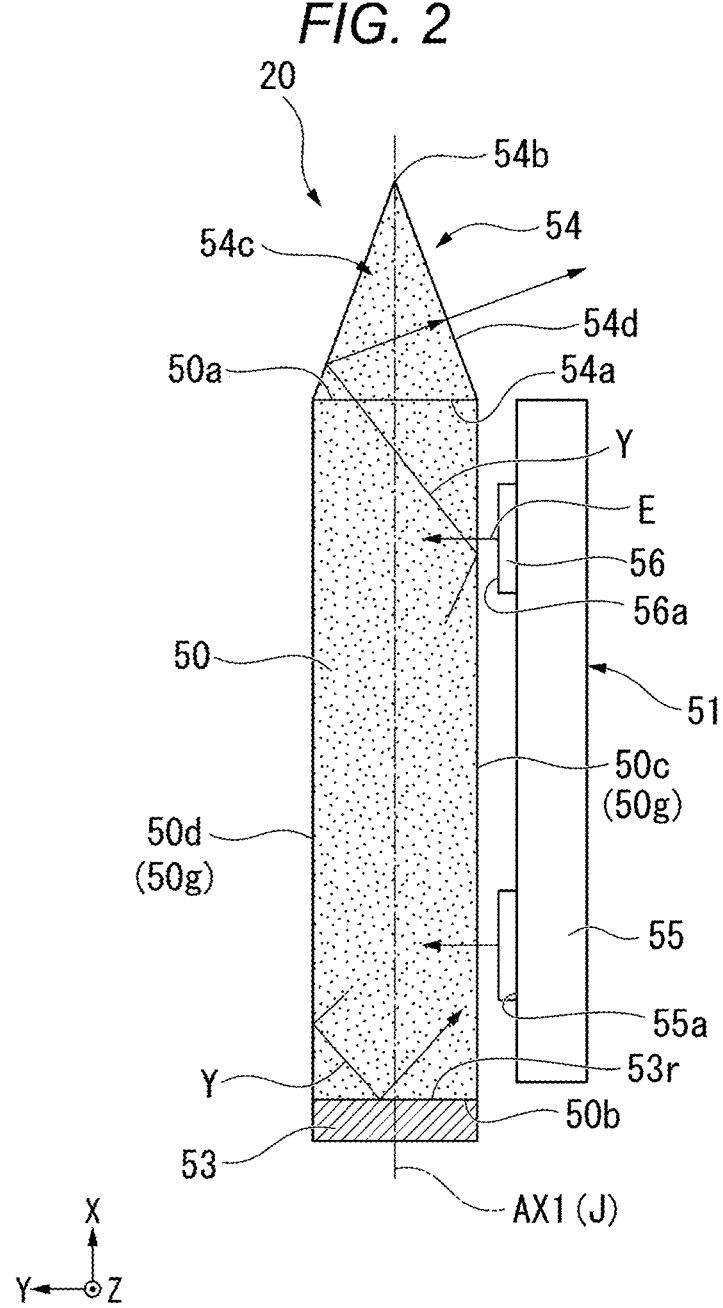
FIG. 2 is a schematic configuration diagram of a first light source device according to the first embodiment.
Figure 3:
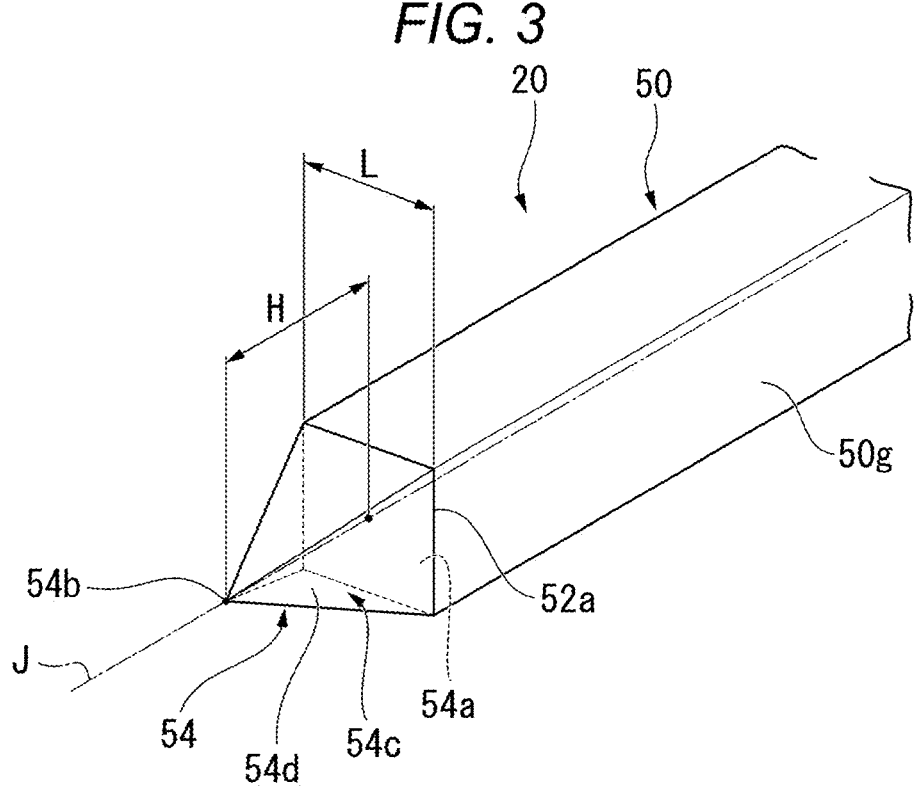
FIG. 3 is a perspective view of a first light source device.

FIG. 2 is a schematic configuration diagram of the first light source device 20 in the first embodiment. FIG. 3 is a perspective view of the first light source device 20.

As shown in FIG. 20, the first light source device 20 is provided with the wavelength conversion member 50, the light source 51, a reflecting member 53, and the exit part 54. Further, the light source 51 is provided with a substrate 55 and light emitting elements 56. Besides the above, the first light source device 20 can be provided with a support member and so on for supporting the wavelength conversion member 50.

The wavelength conversion member 50 has a quadrangular prismatic shape extending in the X-axis direction, and has six faces. A side extending in the X-axis direction of the wavelength conversion member 50 is longer than a side extending in the Y-axis direction and a side extending in the Z-axis direction. Therefore, the X-axis direction corresponds to a longitudinal direction of the wavelength conversion member 50. The length of the side extending in the Y-axis direction and the length of a side extending in the Z-axis direction are equal to each other. In other words, a cross-sectional shape of the wavelength conversion member 50 cut by a plane (the Y-Z plane) perpendicular to the X-axis direction is a rectangular shape. In other words, the cross-sectional shape of the wavelength conversion member 50 cut by the plane perpendicular to the X-axis direction can be a square or can also be a rectangle.

The wavelength conversion member 50 has a first face 50$a$ which crosses the longitudinal direction (the X-axis direction) of the wavelength conversion member 50, and on which the exit part 54 is disposed, a second face 50$b$ which crosses the longitudinal direction (the X-axis direction) of the wavelength conversion member 50, and is located at an opposite side to the first face 50$a$, a third face 50$c$ and a fourth face 50$d$ which cross the first face 50$a$ and the second face 50$b$, and are located at respective sides opposite to each other, and a fifth face and a sixth face (not shown) which cross the third face 50$c$ and the fourth face 50$d$, and are located at respective sides opposite to each other. In the following description, four faces, namely the third face 50$c$, the fourth face 50$d$, the fifth face, and the sixth face, are collectively referred to as side surfaces 50$g$.

An axis which passes through the center of the first face 50$a$ and the center of the second face 50$b$ of the wavelength conversion member 50, and is parallel to the X axis is defined as a central axis J of the wavelength conversion member 50. The central axis J of the wavelength conversion member 50 coincides with the optical axis AX1 of the first light source device 20.

In the present embodiment, since the wavelength conversion member 50 and the exit part 54 are formed of an integrated member as described later, the first face 50$a$ out of the six faces described above is not defined as an existing surface, but is defined as an imaginary surface defining a boundary with the exit part 54. It is desirable for the wavelength conversion member 50 to have a quadrangular prismatic shape, but the wavelength conversion member 50 is not required to have the quadrangular prismatic shape, and can have a shape such as a triangular prismatic shape or a cylindrical shape. When the shape of the wavelength conversion member 50 is a triangular prismatic shape, three faces crossing the first face and the second face are collectively referred to as the side surfaces 50$g$. When the shape of the wavelength conversion member 50 is a cylindrical shape, a single continuous curved surface crossing the first face and the second face is referred to as the side surface 50$g$.

The wavelength conversion member 50 includes at least a phosphor, and converts excitation light E (first light) having a first wavelength band into the fluorescence Y having a second wavelength band different from the first wavelength band. In the present embodiment, the excitation light E emitted from the light emitting elements 56 described later enters the third face 50$c$. The fluorescence Y is guided inside the wavelength conversion member 50, then emitted from the first face 50$a$ toward the exit part 54, and is then emitted from the exit part 54 to the outside.

The wavelength conversion member 50 includes a ceramic phosphor made of a polycrystalline phosphor for performing the wavelength conversion on the excitation light E into the fluorescence Y. The second wavelength band which the fluorescence Y has is a yellow wavelength band of, for example, 490 through 750 nm. In other words, the fluorescence Y is yellow fluorescence including a red light component and a green light component.

It is also possible for the wavelength conversion member 50 to include a single-crystal phosphor instead of the polycrystalline phosphor. Alternatively, the wavelength conversion member 50 can also be formed of fluorescent glass. Alternatively, the wavelength conversion member 50 can also be formed of a material obtained by dispersing a number of phosphor particles in a binder made of glass or resin. The wavelength conversion member 50 made of the material of this kind converts the excitation light E into the fluorescence Y having the second wavelength band.

Specifically, the material of the wavelength conversion member 50 includes, for example, an yttrium aluminum garnet (YAG) phosphor. Citing YAG:Ce including cerium (Ce) as an activator agent as an example, as the material of the wavelength conversion member 50, there is used a material obtained by mixing raw powder including constituent elements such as $Y_2O_3$, $Al_2O_3$ and $CeO_3$ to cause the solid-phase reaction, Y—Al—O amorphous particles obtained by a wet process such as a coprecipitation process or a sol-gel process, and YAG particles obtained by a gas-phase process such as a spray drying process, a flame heat decomposition process or a thermal plasma process.

The light source 51 is provided with the light emitting elements 56 each having a light emitting surface 56a for emitting the excitation light E in the first wavelength band. The light source 51 is disposed so as to be opposed to the third face 50c of the wavelength conversion member 50. The light emitting elements 56 are each formed of, for example, a light emitting diode (LED). As described above, the light source 51 is disposed so as to be opposed to a part of the side surface 50g along the longitudinal direction of the wavelength conversion member 50. It should be noted that the number and the arrangement of the light sources 51 are not particularly limited. The light emitting surface 56a of the light emitting element 56 is arranged so as to be opposed to the third face 50c of the wavelength conversion member 50, and emits the excitation light E toward the third face 50c. The first wavelength band is a wavelength band from a violet color to a blue color of, for example, 400 nm through 480 nm, and has a peak wavelength of, for example, 445 nm.

The substrate 55 supports the light emitting elements 56. The plurality of light emitting elements 56 is disposed on one surface 55a of the substrate 55. The light source 51 is constituted by the light emitting elements 56 and the substrate 55 in the case of the present embodiment, but can also be provided with other optical members such as a light guide plate, a diffuser plate, or a lens. Further, the number of the light emitting elements 56 provided to the substrate 55 is not particularly limited.

The reflecting member 53 is disposed so as to be opposed to the second face 50b of the wavelength conversion member 50. The reflecting member 53 reflects the fluorescence Y which has been guided inside the wavelength conversion member 50, and has reached the second face 50b. The reflecting member 53 is a member separated from the wavelength conversion member 50, and is formed of a plate-like member made of a metal material such as aluminum. The reflecting member 53 has a reflecting surface 53r which is opposed to the second face 50b of the wavelength conversion member 50, and which reflects the fluorescence Y. The reflecting surface 53r can be a surface of the metal material itself, or can be formed of a metal film or a dielectric multilayer film formed on the surface of the metal material.

In the first light source device 20, when the excitation light E emitted from the light emitting elements 56 enters the wavelength conversion member 50, the phosphor included inside the wavelength conversion member 50 is excited, and the fluorescence Y is emitted from an arbitrary light emitting point. The fluorescence Y proceeds from the arbitrary light emitting point toward all directions, but the fluorescence Y proceeding toward the side surfaces 50g proceeds toward the first face 50a or the second face 50b while repeating the total reflection at a plurality of places in the side surfaces 50g. The fluorescence Y proceeding toward the first face 50a enters the exit part 54. Meanwhile, the fluorescence Y proceeding toward the second face 50b is reflected by the reflecting member 53, and then proceeds toward the first face 50a.

A part of the excitation light E which has not been used for the excitation of the phosphor out of the excitation light E having entered the wavelength conversion member 50 is reflected by a member on the periphery of the wavelength conversion member 50 including the light emitting element 56 of the light source 51, or the reflecting member 53 disposed on the second face 50b. Therefore, the part of the excitation light E is confined inside the wavelength conversion member 50 to be reused.

The exit part 54 is disposed along the central axis J of the wavelength conversion member 50. The exit part 54 emits the fluorescence Y generated by the wavelength conversion member 50. In the case of the present embodiment, the wavelength conversion member 50 and the exit part 54 are formed of an integrated member. Therefore, the exit part 54 includes the YAG phosphor similarly to the wavelength conversion member 50.

The exit part 54 includes a first end part 54a, a second end part 54b, and a taper part 54c. The first end part 54a is opposed to the first face 50a of the wavelength conversion member 50. The second end part 54b is located at an opposite side to the first end part 54a along the central axis J. The taper part 54c is a part which gradually decrease in cross-sectional area perpendicular to the central axis J in a direction from the first end part 54a toward the second end part 54b. The taper part 54c has light exit surfaces 54d which are tilted with respect to the central axis J, and which emit the fluorescence Y. In the present embodiment, an entire portion between the first end part 54a and the second end part 54b forms the taper part 54c. Although this configuration is preferable, it is sufficient for the taper part 54 to be formed of at least a part of the portion between the first end part 54a and the second end part 54b.

As shown in FIG. 3, in the present embodiment, the shape of the exit part 54 is a quadrangular pyramidal shape. Therefore, the exit part 54 has the four light exit surfaces 54d. The light exit surfaces 54d each have a triangular shape one side of which has contact with corresponding one of the side surfaces 50g of the wavelength conversion member 50. The first end part 54a has a square shape when viewed from a direction parallel to the central axis J. In the second end part 54b, the vertexes of the four light exit surfaces 54d have contact with each other at a single point to form a pointed shape. The exit part 54 is formed by, for example, grinding the end portion of the wavelength conversion member 50 having a quadrangular prismatic shape to be processed into a quadrangular pyramidal shape.

In the case of the light source device not provided with the exit part of this kind, the first surface of the wavelength conversion member functions as the light exit surface, and the fluorescence is emitted from the first surface. However, in this configuration, a proportion of the fluorescence entering the first surface at an incident angle no smaller than the critical angle to the fluorescence which reaches the first surface is relatively high, wherein such fluorescence is totally reflected by the first surface, but is not taken out to the outside. Therefore, in the light source device not provided with the exit part, it is difficult to increase an extraction efficiency of the fluorescence.

In contrast, in the case of the present embodiment, since the light exit surfaces 54d of the exit part 54 are tilted with respect to the central axis J, the proportion of the fluorescence Y entering the light exit surfaces 54d at the incident angle smaller than the critical angle becomes higher compared to when the exit part is not provided. Further, even when the incident angle of the fluorescence Y is no smaller than the critical angle at the time point when the fluorescence Y first enters the light exit surfaces 54d after entering the exit part 54, the proceeding direction of the fluorescence Y changes after the fluorescence Y is totally reflected by the light exit surfaces 54d, and therefore, the fluorescence Y which becomes to have the incident angle smaller than the critical angle occurs at a certain rate at the time point when the fluorescence Y subsequently enters the light exit surfaces

54*d*. In other words, since the fluorescence which becomes to have the incident angle smaller than the critical angle increases every time the total reflection by the light exit surface 54*d* is repeated, according to the present embodiment, it is possible to increase the extraction efficiency of the fluorescence Y compared to when the exit part is not provided.

As shown in FIG. 1, the light modulation element 30 modulates the fluorescence Y emitted from the first light source device 20 based on image information. In the embodiment described above, a transmissive liquid crystal panel is used as the light modulation element 30. The liquid crystal panel is provided with a configuration having a plurality of pixels arranged in a matrix, and capable of adjusting a light transmission rate pixel by pixel. The shape of an effective modulation area of the liquid crystal panel is a rectangular shape. The effective modulation area is an area of the liquid crystal panel except a frame portion and so on which do not make a contribution to display, and an area which has a plurality of pixels, and substantively forms an image. The shape of the effective modulation area can be a square shape, or can also be a rectangular shape having an aspect ratio of 4:3, 16:9, or the like. It should be noted that the transmissive liquid crystal panel has a common configuration, and is known to the public, and therefore, the detailed description thereof will be omitted.

At the light incident side and the light exit side of the liquid crystal panel, there are disposed polarization plates each transmitting predetermined linearly-polarized light. The light modulation element 30 can be provided with a color filter, and is not required to be provided with the color filter. When the light modulation element 30 is provided with the color filter, it is possible for the projector 10 to project a multi-color image. When the light modulation element 30 is not provided with the color filter, it is possible for the projector 10 to project a black-and-white image.

The angle conversion lens 40 is disposed between the first light source device 20 and the light modulation element 30, and transmits the fluorescence Y emitted from the exit part 54. The angle conversion lens 40 refracts the fluorescence Y which is emitted from the exit part 54 with a large emission angle toward the side at which the emission angle decreases. In other words, the emission angle of the fluorescence Y emitted from the angle conversion lens 40 is smaller than the emission angle of the fluorescence Y which enters the angle conversion lens 40. The angle conversion lens 40 is formed of a convex lens having positive power. The angle conversion lens 40 does not collimate the fluorescence Y in the case of the present embodiment, but can be a collimator lens for collimating the fluorescence Y. Further, the angle conversion lens 40 can be formed of an aspherical lens.

Relationship Between Shape of Exit Part and Illuminance Distribution of Fluorescence The inventors conducted a following simulation in order to examine a change in illuminance distribution of the fluorescence Y when changing the shape of the quadrangular pyramid as the outer shape of the exit part 54.

Specifically, as shown in FIG. 3, the inventors conducted the simulation by changing a dimensional ratio H/L defining the length of the exit part 54 in a direction (the X-axis direction) along the central axis J, namely the height of the quadrangular pyramid, as H, and defining the length of the first end part 54*a* in directions (the Y-axis direction and the Z-axis direction) perpendicular to the central axis J, namely the length of a side of the square forming the bottom surface of the quadrangular pyramid, as L. When changing the dimensional ratio H/L, the tilt angle of the light exit surfaces 54*d* of the exit part 54 with respect to the central axis J varies, and therefore, the emission angle distribution and the illuminance distribution of the fluorescence Y vary accordingly.

As simulation conditions, the wavelength conversion member 50 and the exit part 54 are formed of an integrated YAG:Ce phosphor rod, there is used a sample in which the length from the second face 50*b* of the wavelength conversion member 50 to the second end part 54*b* of the exit part 54 is 50 mm, and the dimensional ratio H/L of the exit part 54 is changed to seven levels of 1.2, 1.3, 1.4, 1.5, 1.6, 1.7, and 1.8. As evaluation items, the emission angle distribution of the fluorescence Y emitted from the exit part 54, and the illuminance distribution on an imaginary plane set at a position distant as much as 50 mm from the second end part 54*b*.

Figure 4A:
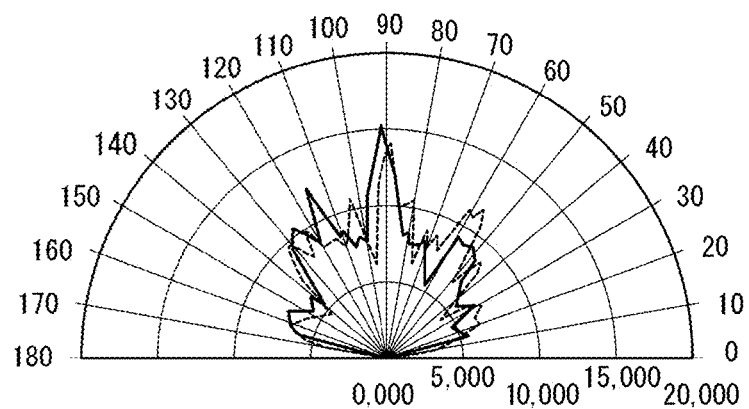
FIG. 4A is a diagram showing an emission angle distribution of fluorescence when H/L=1.2 is set.
Figure 4B:
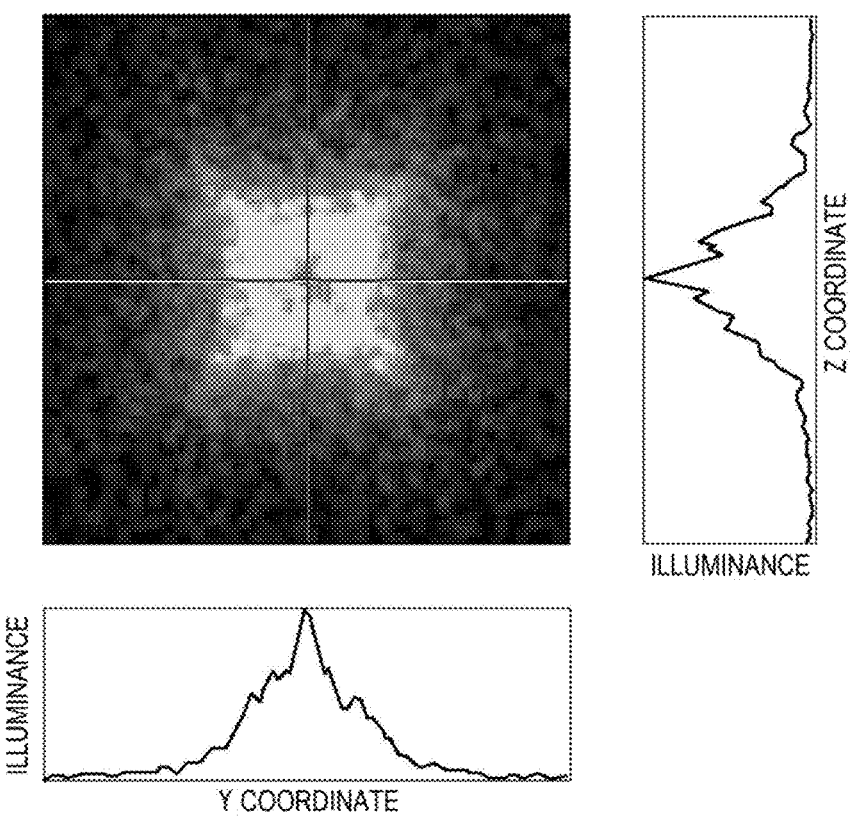
FIG. 4B is a diagram showing an illuminance distribution of the fluorescence when H/L=1.2 is set.
Figure 5A:
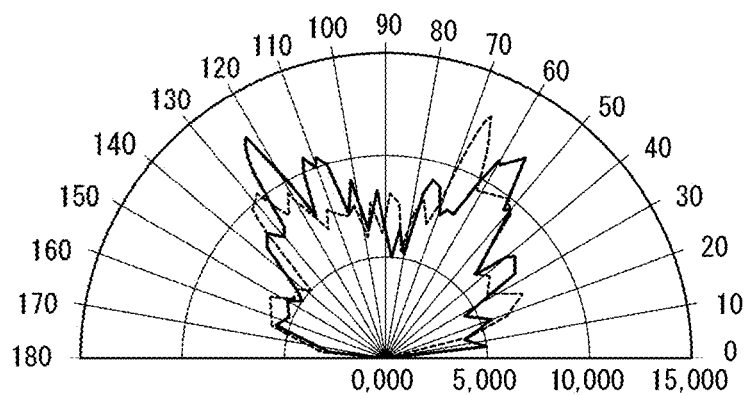
FIG. 5A is a diagram showing the emission angle distribution of the fluorescence when H/L=1.3 is set.
Figure 5B:
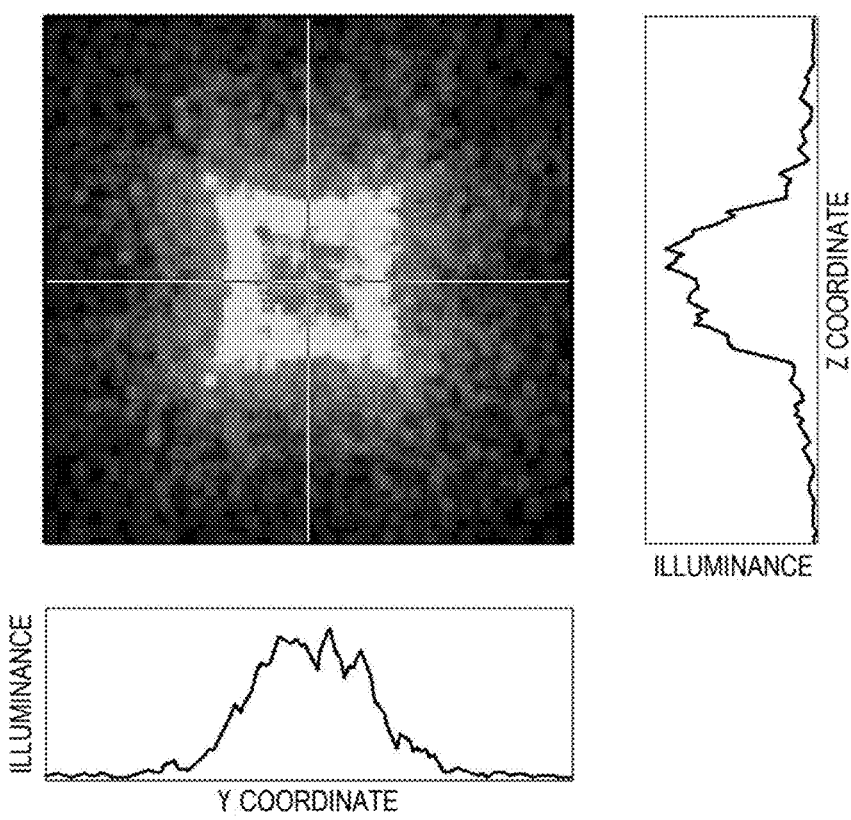
FIG. 5B is a diagram showing the illuminance distribution of the fluorescence when H/L=1.3 is set.
Figure 6A:
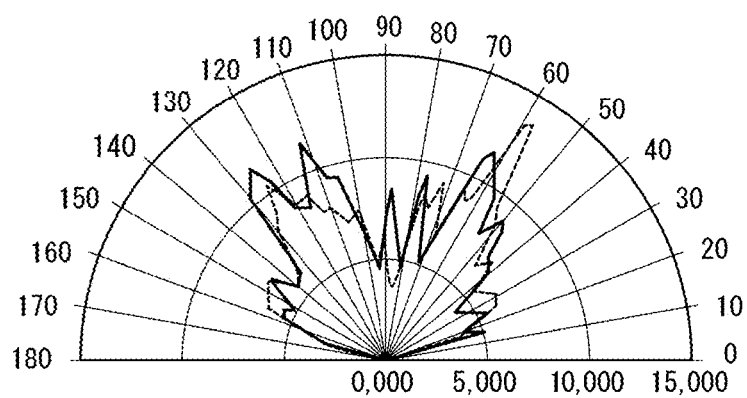
FIG. 6A is a diagram showing the emission angle distribution of the fluorescence when H/L=1.4 is set.
Figure 6B:
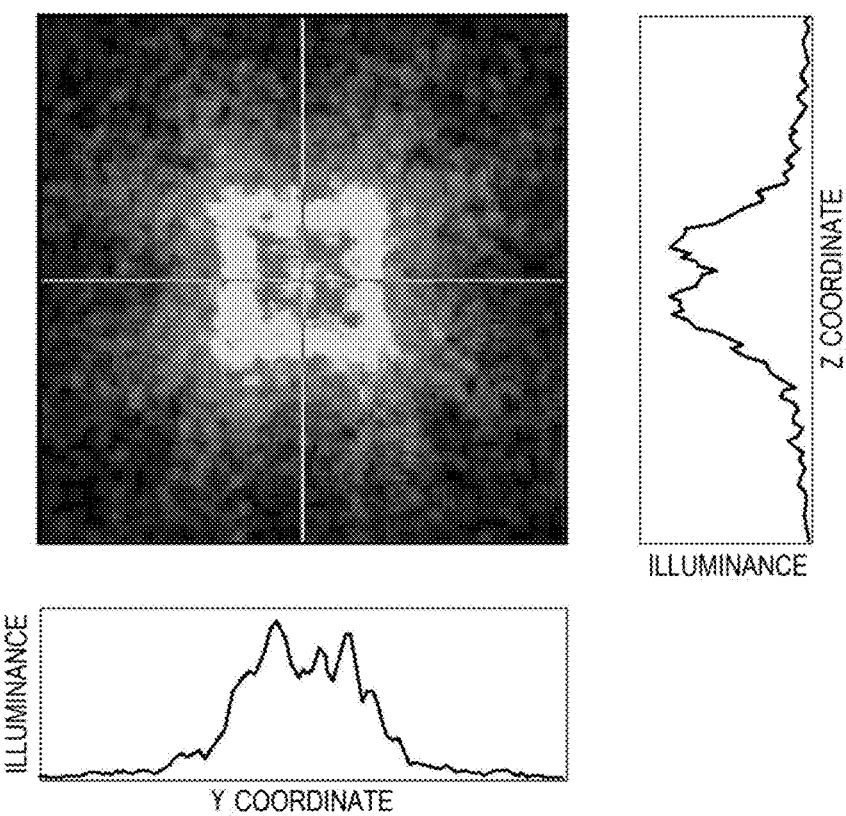
FIG. 6B is a diagram showing the illuminance distribution of the fluorescence when H/L=1.4 is set.
Figure 7A:
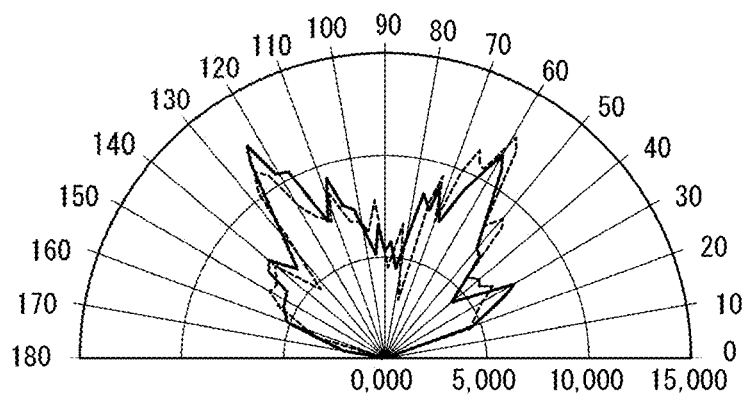
FIG. 7A is a diagram showing the emission angle distribution of the fluorescence when H/L=1.5 is set.
Figure 7B:
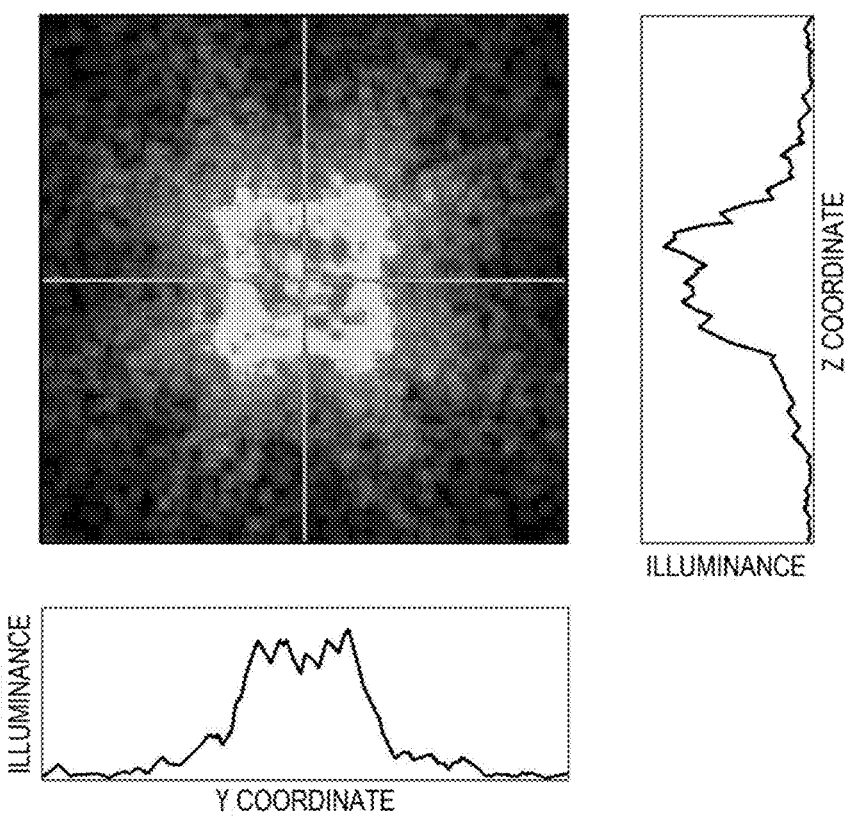
FIG. 7B is a diagram showing the illuminance distribution of the fluorescence when H/L=1.5 is set.
Figure 8A:
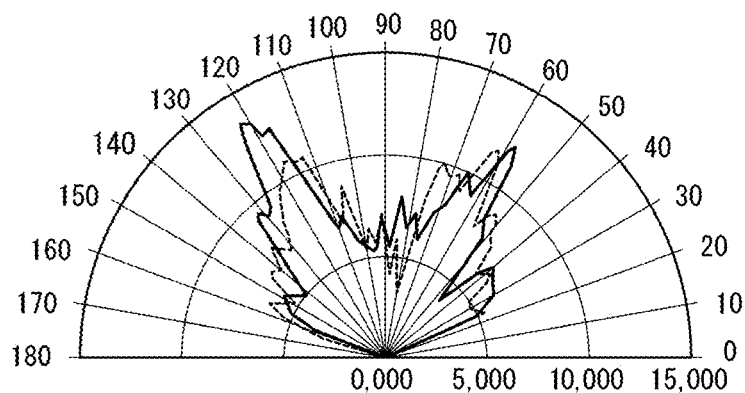
FIG. 8A is a diagram showing the emission angle distribution of the fluorescence when H/L=1.6 is set.
Figure 8B:
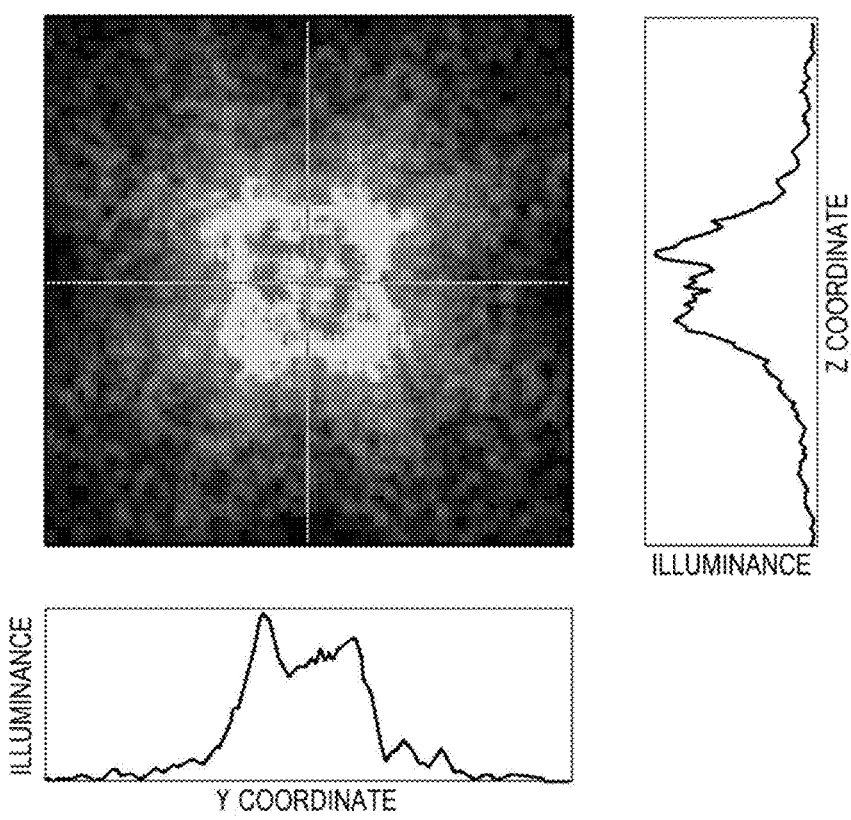
FIG. 8B is a diagram showing the illuminance distribution of the fluorescence when H/L=1.6 is set.
Figure 9A:
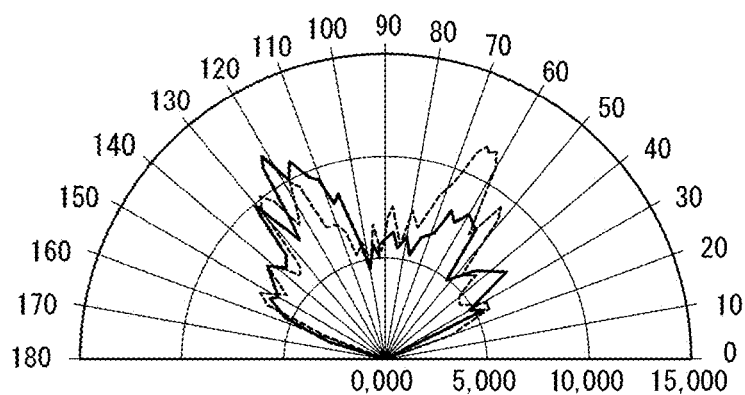
FIG. 9A is a diagram showing the emission angle distribution of the fluorescence when H/L=1.7 is set.
Figure 9B:
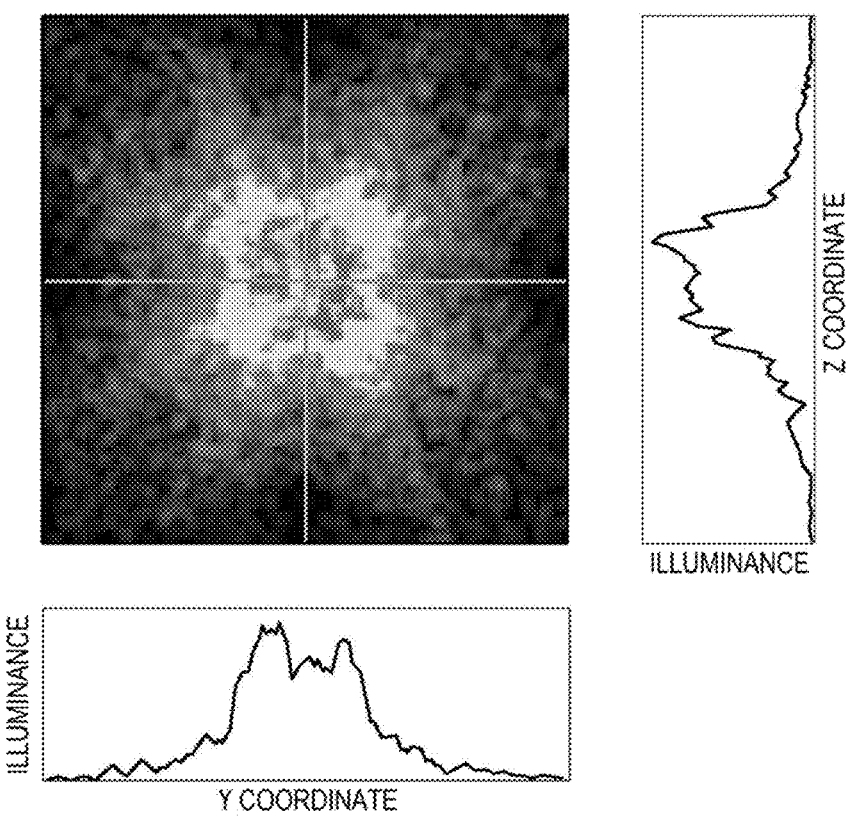
FIG. 9B is a diagram showing the illuminance distribution of the fluorescence when H/L=1.7 is set.
Figure 10A:
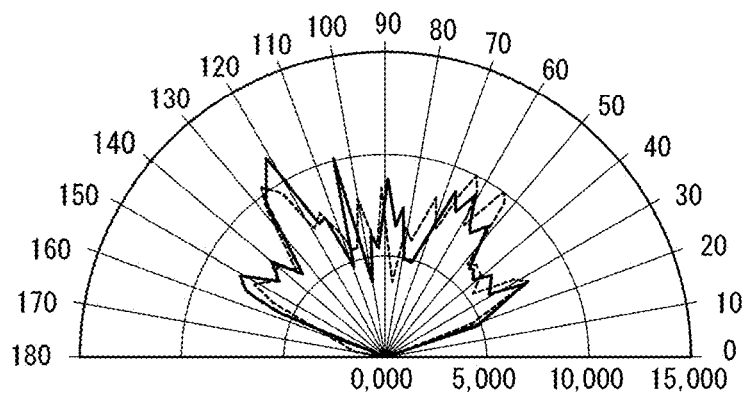
FIG. 10A is a diagram showing the emission angle distribution of the fluorescence when H/L=1.8 is set.
Figure 10B:
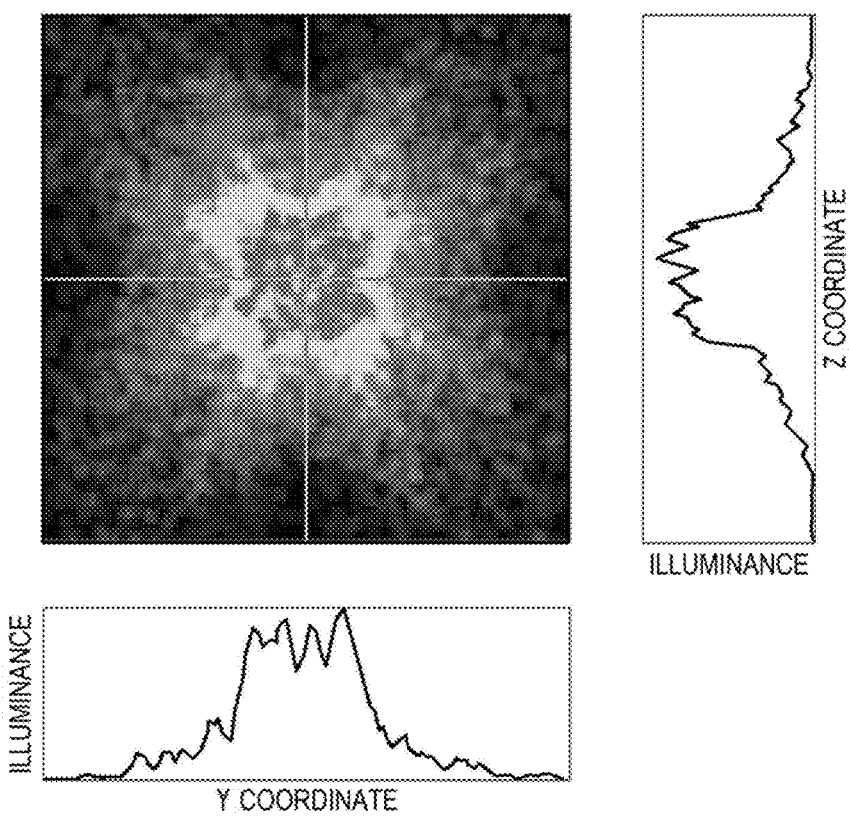
FIG. 10B is a diagram showing the illuminance distribution of the fluorescence when H/L=1.8 is set.

FIG. 4A and FIG. 4B show a result with the dimensional ratio H/L=1.2. FIG. 5A and FIG. 5B show a result with the dimensional ratio H/L=1.3. FIG. 6A and FIG. 6B show a result with the dimensional ratio H/L=1.4. FIG. 7A and FIG. 7B show a result with the dimensional ratio H/L=1.5. FIG. 8A and FIG. 8B show a result with the dimensional ratio H/L=1.6. FIG. 9A and FIG. 9B show a result with the dimensional ratio H/L=1.7. FIG. 10A and FIG. 10B show a result with the dimensional ratio H/L=1.8. In these drawings, the drawings having A at the tail of the figure number each show the emission angle distribution, and the drawings having B at the tail of the figure number each show the illuminance distribution.

The solid lines shown in FIG. 4A, FIG. 5A, FIG. 6A, FIG. 7A, FIG. 8A, FIG. 9A, and FIG. 10A each represent the emission angle distribution of the fluorescence Y when viewed from the +Z-axis direction toward the −Z-axis direction when viewed from the −X-axis direction toward the +X-axis direction (when viewed toward the exit side along the central axis J) in FIG. 2. The direction of 90° in a polar angle shown in these drawings corresponds to a direction along the central axis J of the wavelength conversion member 50. A unit of the numerical value represented in the horizontal axis of these drawings is emission power (mW/sr), and is a physical quantity representing emission energy emitted per unit time in a predetermined direction from an emission source. It should be noted that an absolute value itself in the horizontal axis is a relative index with no special significance.

In each of FIG. 4B, FIG. 5B, FIG. 6B, FIG. 7B, FIG. 8B, FIG. 9B, and FIG. 10B, there is shown the illuminance distribution on the Y-Z plane at a position distant as much as 50 mm from the second end part 54*b* of the exit part 54 when viewed from the −X-axis direction toward the +X-axis direction (when viewed toward the exit side along the central axis J) in FIG. 2. With respect to the illuminance distribution shown in an upper left part of each of the drawings, a diagram obtained by graphing the illuminance distribution in the Y-axis direction is shown at the right side of the illuminance distribution, and a diagram obtained by graphing the illuminance distribution in the Z-axis direction is shown at the lower side of the illuminance distribution. In each of the graphs, the horizontal axis represents a coordinate (a Y coordinate, a Z coordinate) on each of the axes, and the vertical axis represents the illuminance. The values on the horizontal axis and the vertical axis are relative values.

As shown in FIG. 4A and FIG. 4B, in the case of the dimensional ratio H/L=1.2, since the emission power in an area around the central axis J is higher compared to the emission power in an area distant from the central axis J, the illuminance distribution has a sharp peak in the area near the central axis J. Therefore, the illuminance in the area near the central axis J is high, but there is exhibited a tendency that the illuminance rapidly decreases at a position distant from the central axis J.

In contrast, as shown in FIG. 5A and FIG. 5B, in the case of the dimensional ratio H/L=1.3, since the emission energy in the area around the central axis J is dispersed to the area distant from the central axis J, the illuminance distribution in the area near the central axis J exhibits a flatter shape compared to the case of the dimensional ratio H/L=1.2. Therefore, it is possible to obtain the illuminance no lower than the predetermined value throughout a range from the area near the central axis J to the periphery of the substantially square area. Thus, when illuminating the light modulation element having, for example, a rectangular effective modulation area with this light source device, it is possible to obtain an image bright in the four corners of the effective modulation area. Further, as shown in FIG. 6A, FIG. 6B, and the subsequent drawings, even when increasing the dimensional ratio H/L from 1.4 to 1.8, substantially the same advantages as in the case of the dimensional ratio H/L=1.3 can be obtained.

It should be noted that although not shown in the simulation, it is desirable that the upper limit of the dimensional ratio H/L is around 3.0. The reason is that when the dimensional ratio H/L exceeds 3.0, the area of a part from which the light is emitted increases, and by the apparent size of the light source increasing, the light beams having passed through the pixels adjacent to each other are mixed, and thus, the resolution decreases. Further, from the viewpoint of processing, the tip portion becomes thin, and easy to crack.

Advantages of First Embodiment

The projector 10 according to the present embodiment is provided with the first light source device 20, and the light modulation element 30 for modulating the fluorescence Y emitted from the first light source device 20. The first light source device 20 is provided with the light emitting elements 56 for emitting the excitation light E, the wavelength conversion member 50 which includes the phosphor, and converts the excitation light E emitted from the light emitting elements 56 into the fluorescence Y, and the exit part 54 which is disposed along the central axis J of the wavelength conversion member 50, and emits the fluorescence Y generated in the wavelength conversion member 50. The exit part 54 has the first end part 54a opposed to the wavelength conversion member 50, the second end part 54b located at the opposite side to the first end part 54a along the central axis J, and the taper part 54c gradually decreasing in the cross-sectional area perpendicular to the central axis J in the direction from the first end part 54a toward the second end part 54b. The taper part 54c has light exit surfaces 54d which are tilted with respect to the central axis J, and which emit the fluorescence Y.

According to the projector 10 related to the present embodiment, since the light modulation element 30 is irradiated with the fluorescence Y generated in the first light source device 20, the fluorescence Y emitted from the light modulation element 30 is light sufficiently lower in coherence compared to a laser beam. Therefore, it is possible to obtain the image which is lower in interference of the light scattered on the projection target compared to the case of the laser beam, and is lower in speckle noise. Further, since the fluorescence Y is emitted from the exit part 54 having the configuration described above, and the light emitting position in the first light source device 20 is approximate to the point light source, there is no chance for the light beams having passed through the plurality of pixels of the light modulation element 30 to be mixed with each other, and the imaging optics becomes unnecessary. Thus, it is possible to realize the focus-free projector 10 capable of projecting a clear image on the projection target.

In the projector 10 according to the present embodiment, the wavelength conversion member 50 has the first face 50a and the second face 50b located at the opposite sides to each other in the longitudinal direction of the wavelength conversion member 50, and the third face 50c crossing the first face 50a and the second face 50b, and the fluorescence Y is emitted from the first face 50a toward the exit part 54, and the excitation light E emitted from the light emitting elements 56 enters the third face 50c.

According to this configuration, since it is possible to emit the fluorescence Y from the exit part 54 which is sufficiently smaller with respect to the length in the longitudinal direction of the wavelength conversion member 50, and at the same time, it is possible to provide the third face 50C which the excitation light E enters at a large size, it is possible to realize the first light source device which is high in efficiency, compact in configuration, and approximate to the point light source.

In the projector 10 related to the present embodiment, the shape of the first face 50a of the wavelength conversion member 50 is a rectangular shape, and the shape of the effective modulation area of the light modulation element 30 is a rectangular shape.

According to this configuration, since the illumination area of the fluorescence Y emitted from the first light source device 20 has the rectangular shape, it is possible to efficiently illuminate the light modulation element 30 in the four corners of the effective modulation area.

In the projector 10 according to the present embodiment, the shape of the exit part 54 is a quadrangular pyramidal shape.

According to this configuration, it is possible to obtain the fluorescence Y having the rectangular illuminance distribution. Further, it is possible to easily form the exit part 54 in an end portion of the wavelength conversion member 50 having the quadrangular prismatic shape.

In the projector 10 according to the present embodiment, the dimensional ratio H/L of the exit part 54 is no lower than 1.3.

According to this configuration, since the dimensional ratio H/L of the exit part 54 is appropriately set, it is possible to realize the projector 10 capable of projecting the projection image which is low in illuminance variation, and bright in the four corners of the projection target surface as described above.

In the projector 10 according to the present embodiment, the wavelength conversion member 50 and the exit part 54 are formed of an integrated member.

According to this configuration, it is possible to easily form the exit part 54 using a method such as grinding processing of the phosphor in the manufacturing process of the first light source device 20. Further, since the phosphor is included inside the exit part 54, and the excitation light E having entered the exit part 54 is converted into the fluorescence Y, it is possible to increase the light intensity of the fluorescence Y compared to when the phosphor is not included inside the exit part. Further, since there is no bonding surface between the wavelength conversion member 50 and the exit part 54, it is possible to prevent the loss caused when the fluorescence Y is transmitted through the bonding surface.

It should be noted that when an amount of the fluorescence Y required to be taken out from the exit part 54 is not so large, it is possible for the exit part 54 to be formed of a light transmissive member separated from the wavelength conversion member 50, and then bonded to the wavelength conversion member 50. According to this configuration, since it is possible to manufacture the exit part 54 with a method such as a press work using a metal mold separately from the wavelength conversion member 50, it is possible to eliminate the grinding processing of the phosphor.

The projector 10 according to the present embodiment is further provided with the angle conversion lens 40 for transmitting the fluorescence Y emitted from the exit part 54. The emission angle of the fluorescence Y emitted from the angle conversion lens 40 is smaller than the emission angle of the fluorescence Y which enters the angle conversion lens 40.

According to this configuration, it is possible to suppress the spread of the fluorescence Y emitted from the first light source device 20, and thus, it is possible to project the bright image at a farther position.

In the projector 10 according to the present embodiment, the angle conversion lens 40 is disposed between the first light source device 20 and the light modulation element 30.

According to this configuration, it is possible to make the fluorescence Y small in emission angle enter the light modulation element 30, and thus, it is possible to obtain a clearer image.

In the projector 10 according to the present embodiment, the angle conversion lens 40 can be formed of an aspherical lens.

According to this configuration, it is possible to prevent the light beams emitted from the respective pixels from being mixed with each other due to the spherical aberration which the angle conversion lens 40 has, and thus prevent the image from blurring.

In the projector 10 according to the present embodiment, the light modulation element 30 is formed of the transmissive liquid crystal panel.

According to this configuration, it is possible to realize the liquid crystal projector capable of projecting a bright projection image.

Second Embodiment

A second embodiment of the present disclosure will hereinafter be described using FIG. 11.

A basic configuration of light source devices provided to a projector according to the second embodiment is substantially the same as that in the first embodiment, and therefore, the description of the basic configuration of the light source device will be omitted.

Figure 11:
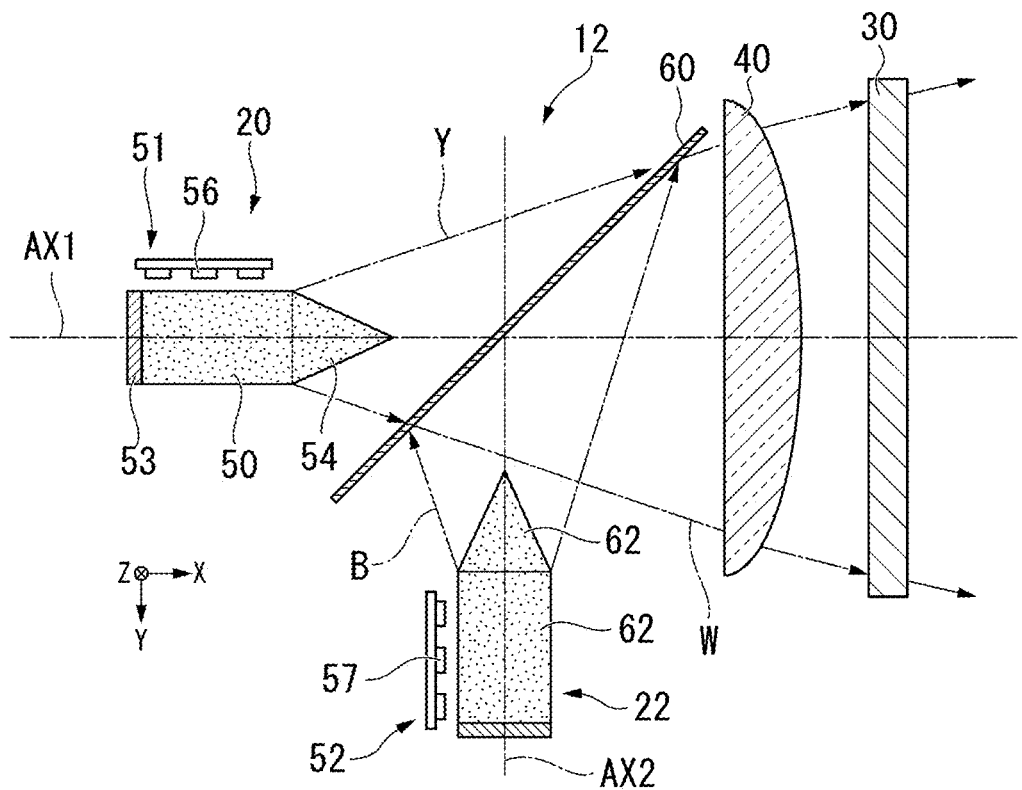
FIG. 11 is a schematic configuration diagram of a projector according to a second embodiment.

FIG. 11 is a schematic configuration diagram of a projector 12 according to the second embodiment.

In FIG. 11, the constituents common to the drawing used in the first embodiment are denoted by the same reference symbols, and the description thereof will be omitted.

As shown in FIG. 11, the projector 12 according to the present embodiment is provided with the first light source device 20, a second light source device 22, a light combining element 60, the light modulation element 30, and the angle conversion lens 40.

The second light source device 22 is provided with a wavelength conversion member 61, a light source 52, the reflecting member 53, and an exit part 62. The basic configuration of the second light source device 22 is substantially the same as that of the first light source device 20, but a type of the phosphor included in the wavelength conversion member 61 is different from that of the wavelength conversion member 50 of the first light source device 20. The second light source device 22 emits blue fluorescence B (third light) having a third wavelength band different from the first wavelength band which the excitation light E has, and the second wavelength band which the fluorescence Y has.

The wavelength conversion member 61 is formed of, for example, fluorescent glass obtained by dispersing rare-earth ions in glass, or a material obtained by dispersing blue phosphor in a binder such as glass or resin. Specifically, as the fluorescent glass, there is used Lumilass (a trade name; made by Sumita Optical Glass, Inc.) or the like. As the blue phosphor, there is used, for example, $BaMgAl_{10}O_{17}:Eu(II)$. The wavelength conversion member 61 converts the excitation light emitted from light emitting elements 57 into the fluorescence B in the blue wavelength band of, for example, 450 through 495 nm. As the light emitting elements 57 of the second light source device 22, there are used light emitting elements which emit the excitation light in an ultraviolet wavelength band or a violet wavelength band.

The light combining element 60 is disposed at a position where the optical axis AX1 of the first light source device 20 and an optical axis AX2 of the second light source device 22 cross each other. The light combining element 60 is formed of a dichroic mirror which reflects light in the blue wavelength band while transmitting light in the yellow wavelength band. The light combining element 60 combines the yellow fluorescence Y emitted from the first light source device 20 and the blue fluorescence B emitted from the second light source device 22 with each other, and then emits white composite light (first composite light) W in a direction along the optical axis AX1.

The light modulation element 30 is disposed at the exit side of the light combining element 60. Between the light combining element 60 and the light modulation element 30, there is disposed the angle conversion lens 40. The light modulation element 30 is formed of a transmissive liquid crystal panel similarly to the first embodiment. The light modulation element 30 modulates the white composite light W which is emitted from the light combining element 60, based on the image information. The light modulation element 30 can be provided with a color filter, and is not required to be provided with the color filter. When the light modulation element 30 is provided with the color filter, it is possible for the projector 12 to project a color image. When the light modulation element 30 is not provided with the color filter, it is possible for the projector 12 to project a black-and-white image.

Advantages of Second Embodiment

Also in the present embodiment, it is possible to obtain substantially the same advantages as those of the first embodiment such as an advantage that it is possible to realize the focus-free projector 12 capable of projecting the image low in speckle noise.

The projector 12 according to the present embodiment is further provided with the second light source device 22 for emitting the fluorescence B having the third wavelength band, and the light combining element 60 which combines the fluorescence Y emitted from the first light source device 20 and the fluorescence B emitted from the second light source device 22 with each other, and emits the composite light W. The light modulation element 30 modulates the composite light W emitted from the light combining element 60.

According to this configuration, it is possible to form an image using the white composite light W obtained by combining the fluorescence Y emitted from the first light source device 20 and the fluorescence B emitted from the second light source device 22 with each other. Thus, it is possible to enhance color reproducibility of the image compared to the projector 10 according to the first embodiment which uses only the fluorescence Y emitted from the first light source device 20.

Third Embodiment

A third embodiment of the present disclosure will hereinafter be described using FIG. 12.

A basic configuration of light source devices provided to a projector according to the third embodiment is substantially the same as that in the first embodiment, and therefore, the description of the basic configuration of the light source device will be omitted.

Figure 12:
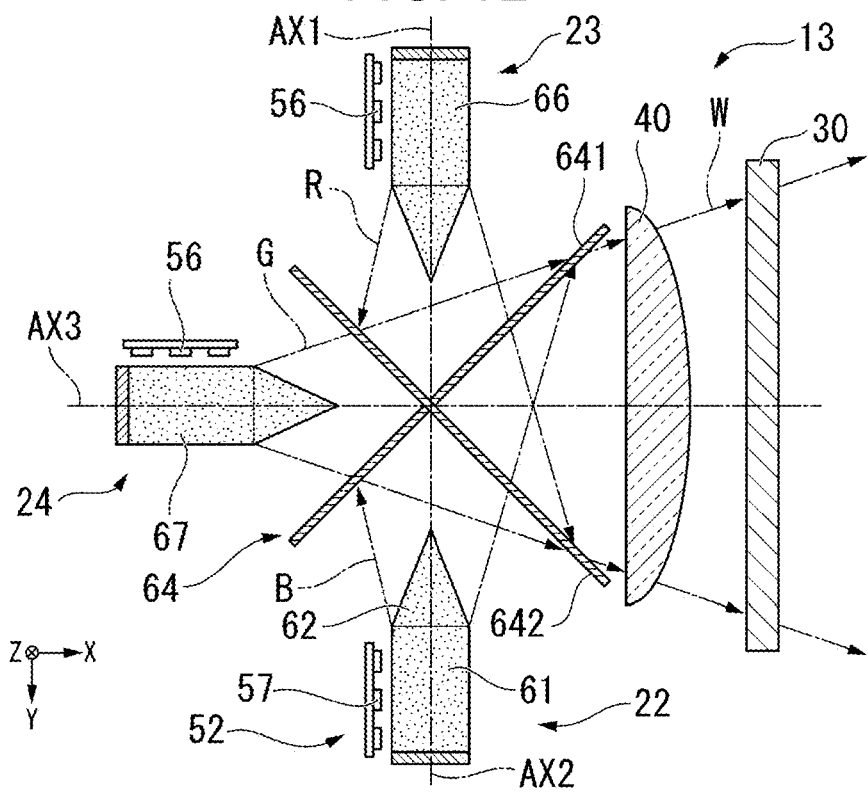
FIG. 12 is a schematic configuration diagram of a projector according to a third embodiment.

FIG. 12 is a schematic configuration diagram of a projector 13 according to the third embodiment.

In FIG. 12, the constituents common to the drawings used in the previous embodiments are denoted by the same reference symbols, and the description thereof will be omitted.

As shown in FIG. 12, the projector 13 according to the present embodiment is provided with a first light source device 23, the second light source device 22, a third light source device 24, a light combining element 64, the light modulation element 30, and the angle conversion lens 40.

The first light source device 23, the second light source device 22, and the third light source device 24 have respective basic configurations the same as each other, but are different in type of the phosphor included in the wavelength conversion member from the first light source device. The first light source device 23 emits red fluorescence R having a second wavelength band different from the first wavelength band which the excitation light has. The second light source device 22 emits the blue fluorescence B having the third wavelength band different from the first wavelength band which the excitation light has, and the second wavelength band which the fluorescence R has. The third light source device 24 emits green fluorescence G (fourth light) having a fourth wavelength band different from the first wavelength band which the excitation light has, the second wavelength band which the fluorescence R has, and the third wavelength band which the fluorescence B has.

It should be noted that the second light source device 22 in the present embodiment is the same as the second light source device 22 in the second embodiment, and therefore, the description thereof will be omitted.

In the first light source device 23, as the phosphor, the wavelength conversion member 66 includes, for example, the YAG phosphor (any one of Pr:YAG, Eu:YAG, and Cr:YAG) made of $(Y_{1-x}, Gd_x)_3(Al,Ga)_5O_{12}$ having any one of Pr, Eu, and Cr dispersed as an activator agent. It should be noted that it is possible for the activator agent to include a species selected from Pr, Eu, and Cr, or to be a coactivation type activator agent including two or more species selected from Pr, Eu, and Cr. The wavelength conversion member 66 converts the excitation light emitted from the light emitting elements 56 into the fluorescence R in the red wavelength band of, for example, 600 through 800 nm. The light emitting elements 56 of the first light source device 23 emits the excitation light in the ultraviolet wavelength band, the violet wavelength band, or the blue wavelength band.

In the third light source device 24, the wavelength conversion member 67 includes a phosphor material such as a $Lu_3Al_5O_{12}:Ce^{3+}$ phosphor, a $Y_3O_4:Eu^{2+}$ phosphor, a $(Ba,Sr)_2SiO_4:Eu^{2+}$ phosphor, a $Ba_3Si_6O_{12}N_2:Eu^{2+}$ phosphor, or a $(Si,Al)_6(O,N)_8:Eu^{2+}$ phosphor as the phosphor. The wavelength conversion member 67 converts the excitation light emitted from the light emitting elements 56 into the fluorescence G in the green wavelength band of, for example, 500 through 570 nm. The light emitting elements 56 of the third light source device 24 emits the excitation light in the ultraviolet wavelength band, the violet wavelength band, or the blue wavelength band.

The light combining element 64 is disposed at a position where the optical axis AX1 of the first light source device 23, the optical axis AX2 of the second light source device 22, and an optical axis AX3 of the third light source device 24 cross each other. The light combining element 64 is provided with a first dichroic mirror 641 and a second dichroic mirror 642. The first dichroic mirror 641 reflects light in the blue wavelength band while transmitting light in a wavelength band other than the blue wavelength band. The second dichroic mirror 642 reflects light in the red wavelength band while transmitting light in a wavelength band other than the red wavelength band. Due to this configuration, the light combining element 64 combines the red fluorescence R emitted from the first light source device 23, the blue fluorescence B emitted from the second light source device 22, and the green fluorescence G emitted from the third light source device 24 with each other, and then emits white composite light (second composite light) W in a direction along the optical axis AX3.

The light modulation element 30 is disposed at the exit side of the light combining element 64. Between the light combining element 64 and the light modulation element 30, there is disposed the angle conversion lens 40. The light modulation element 30 is formed of a transmissive liquid crystal panel similarly to the first embodiment. The light modulation element 30 modulates the white composite light W which is emitted from the light combining element 64, based on the image information.

The light modulation element 30 can be provided with a color filter, and is not required to be provided with the color filter. When the light modulation element 30 is provided with the color filter, it is possible for the projector 13 to project a color image. When the light modulation element 30 is not provided with the color filter, it is possible for the projector 13 to project a black-and-white image. Further, in the configuration in which the light modulation element 30 is not provided with the color filter, it is possible to adopt a configuration in which the first light source device 23, the second light source device 22, and the third light source device 24 are sequentially lit, and the light modulation element 30 is driven so as to sequentially form an image for the red light, an image for the blue light, and an image for the green light in sync with the lighting timing of the respective light source devices. According to this configuration, it is possible for the projector 13 to project a color image.

Advantages of Third Embodiment

Also in the present embodiment, it is possible to obtain substantially the same advantages as those of the first embodiment such as an advantage that it is possible to realize the focus-free projector 13 capable of projecting the image low in speckle noise.

The projector 13 according to the present embodiment is provided with the first light source device 23 for emitting the fluorescence R in the red wavelength band, the second light source device 22 for emitting the fluorescence B in the blue wavelength band, and the third light source device 24 for emitting the fluorescence G in the green wavelength band. The light combining element 64 combines the fluorescence R emitted from the first light source device 23, the fluorescence B emitted from the second light source device 22, and the fluorescence G emitted from the third light source device 24 with each other to emit the white composite light W. The light modulation element 30 modulates the composite light W emitted from the light combining element 64.

According to this configuration, it is possible to form an image using the white composite light W obtained by combining the fluorescence R emitted from the first light source device 23, the fluorescence B emitted from the second light source device 22, and the fluorescence G emitted from the third light source device 24 with each other. Thus, it is possible to enhance the color reproducibility of the image compared to the projector according to the first embodiment which uses only the fluorescence Y emitted from the first light source device. Further, since just one light modulation element is sufficient, it is possible to simplify the configuration of the projector 13.

In the projector 13 according to the present embodiment, when the light modulation element 30 has the configuration provided with a color filter, it is possible to project a color image. According to this configuration, since the liquid crystal panels high in response speed are not required unlike the system of sequentially driving the light source devices and the light modulation element, design of the light modulation element 30 becomes easy.

Alternatively, in the projector 13 according to the present embodiment, by adopting a configuration in which the first light source device 23, the second light source device 22, and the third light source device 24 are each sequentially lit, and the light modulation element 30 is driven in sync with the lighting timing of the respective light source devices, it is possible to project a color image. According to this configuration, since the light modulation element 30 is not required to be provided with the color filter, and the number of pixels increases compared to the color filter system, it is possible to obtain a high-definition bright image.

Fourth Embodiment

A fourth embodiment of the present disclosure will hereinafter be described using FIG. 13.

A basic configuration of light source devices provided to a projector according to the fourth embodiment is substantially the same as that in the first embodiment, and therefore, the description of the basic configuration of the light source device will be omitted.

Figure 13:
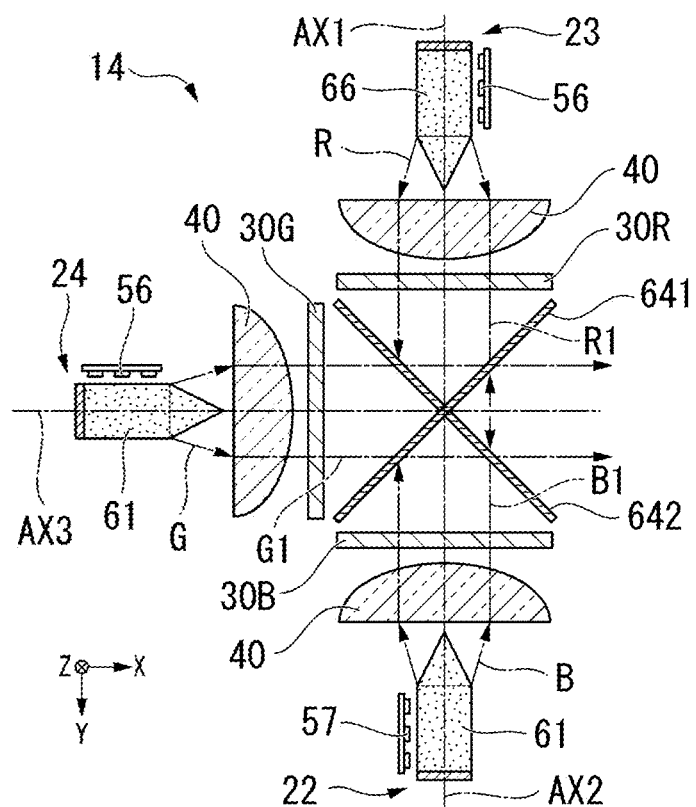
FIG. 13 is a schematic configuration diagram of a projector according to a fourth embodiment.

FIG. 13 is a schematic configuration diagram of a projector 14 according to the fourth embodiment.

In FIG. 13, the constituents common to the drawings used in the previous embodiments are denoted by the same reference symbols, and the description thereof will be omitted.

As shown in FIG. 13, the projector 14 according to the present embodiment is provided with the first light source device 23, the second light source device 22, the third light source device 24, a first light modulation element 30R, a second light modulation element 30B, a third light modulation element 30G, the light combining element 64, and the angle conversion lenses 40. The first light source device 23, the second light source device 22, and the third light source device 24 are substantially the same as the respective light source devices in the third embodiment.

The first light modulation element 30R is disposed at a light exit side of the first light source device 23. The first light modulation element 30R modulates the red fluorescence R emitted from the first light source device 23 based on the image information to emit red modulated light R1 as first modulated light. The second light modulation element 30B is disposed at a light exit side of the second light source device 22. The second light modulation element 30B modulates the blue fluorescence B emitted from the second light source device 22 based on the image information to emit blue modulated light B1 as second modulated light. The third light modulation element 30G is disposed at a light exit side of the third light source device 24. The third light modulation element 30G modulates the green fluorescence G emitted from the third light source device 24 based on the image information to emit green modulated light G1 as third modulated light.

The first light modulation element 30R, the second light modulation element 30B, and the third light modulation element 30G are each formed of a transmissive liquid crystal panel. The liquid crystal panel is not provided with a color filter.

The light combining element 64 has substantially the same configuration as that of the light combining element 64 in the third embodiment, and is different from that in the third embodiment in the point that the light combining element 64 combines the modulated light which has already been modulated by the respective light modulation elements. In other words, the light combining element 64 combines the red modulated light R1 emitted from the first light modulation element 30R, the blue modulated light B1 emitted from the second light modulation element 30B, and the green modulated light G1 emitted from the third light modulation element 30G with each other.

Between the first light source device 23 and the first light modulation element 30R, there is disposed the angle conversion lens 40. Between the second light source device 22 and the second light modulation element 30B, there is disposed the angle conversion lens 40. Between the third light source device 24 and the third light modulation element 30G, there is disposed the angle conversion lens 40.

Advantages of Fourth Embodiment

Also in the present embodiment, it is possible to obtain substantially the same advantages as those of the first embodiment such as an advantage that it is possible to realize the focus-free projector 14 capable of projecting the image low in speckle noise.

The projector 14 according to the present embodiment is provided with the first light source device 23 for emitting the fluorescence R in the red wavelength band, the second light source device 22 for emitting the fluorescence B in the blue wavelength band, the third light source device 24 for emitting the fluorescence G in the green wavelength band, the first light modulation element 30R for modulating the fluorescence R emitted from the first light source device 23, the second light modulation element 30B for modulating the fluorescence B emitted from the second light source device 22, and the third light modulation element 30G for modulating the fluorescence G emitted from the third light source device 24. The light combining element 64 combines the red modulated light R1 emitted from the first light modulation element 30R, the blue modulated light B1 emitted from the second light modulation element 30B, and the green modulated light G1 emitted from the third light modulation element 30G with each other.

According to this configuration, it is possible to enhance the color reproducibility of the image compared to the projector according to the first embodiment which uses only the fluorescence Y emitted from the first light source device. Further, unlike the third embodiment, it is possible to project a color image without providing the liquid crystal panel with the color filter, and without driving the light source devices and the light modulation elements in a time-sequential manner. Therefore, it is possible to obtain a high-definition bright image in addition to the fact that the liquid crystal panel high in response speed is not required, and thus, the design of the light modulation elements becomes easy.

Fifth Embodiment

A fifth embodiment of the present disclosure will hereinafter be described using FIG. 14.

A basic configuration of light source devices provided to a projector according to the fifth embodiment is substantially the same as that in the first embodiment, and therefore, the description of the basic configuration of the light source device will be omitted.

Figure 14:
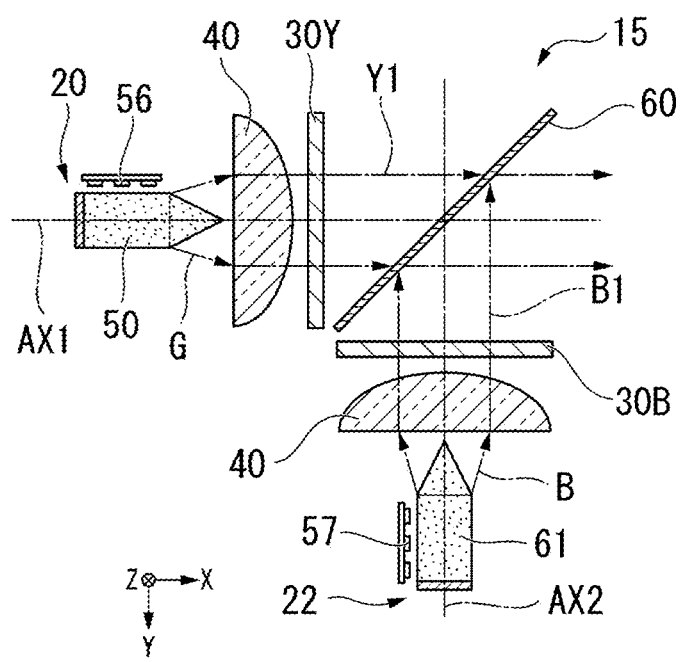
FIG. 14 is a schematic configuration diagram of a projector according to a fifth embodiment.

FIG. 14 is a schematic configuration diagram of a projector 15 according to the fifth embodiment.

In FIG. 14, the constituents common to the drawings used in the previous embodiments are denoted by the same reference symbols, and the description thereof will be omitted.

As shown in FIG. 14, the projector 15 according to the present embodiment is provided with the first light source device 20, the second light source device 22, a first light modulation element 30Y, the second light modulation element 30B, the light combining element 60, and the angle conversion lenses 40. The first light source device 20 and the second light source device 22 are substantially the same as the respective light source devices in the second embodiment.

The first light modulation element 30Y modulates the yellow fluorescence Y emitted from the first light source device 20. The second light modulation element 30B modulates the blue fluorescence B emitted from the second light source device 22. The first light modulation element 30Y and the second light modulation element 30B are each formed of a transmissive liquid crystal panel. The first light modulation element 30Y can be provided with a color filter of two colors of red and green, and is not required to be provided with the color filter. The second light modulation element 30B is not provided with the color filter.

The light combining element 60 has substantially the same configuration as that of the light combining element 60 in the second embodiment, and is different from that in the second embodiment in the point that the light combining element 60 combines the modulated light which has already been modulated by the respective light modulation elements. Specifically, the light combining element 60 combines yellow modulated light Y1 emitted from the first light modulation element 30Y and the blue modulated light B1 emitted from the second light modulation element 30B with each other. It should be noted that when the first light modulation element 30Y is provided with the color filter of the two colors, the yellow modulated light Y1 described above is light including red modulated light and green modulated light.

Between the first light source device 20 and the first light modulation element 30Y, there is disposed the angle conversion lens 40. Between the second light source device 22 and the second light modulation element 30B, there is disposed the angle conversion lens 40.

Advantages of Fifth Embodiment

Also in the present embodiment, it is possible to obtain substantially the same advantages as those of the first embodiment such as an advantage that it is possible to realize the focus-free projector 15 capable of projecting the image low in speckle noise.

The projector 15 according to the present embodiment is provided with the first light source device 20 for emitting the fluorescence Y in the yellow wavelength band, the second light source device 22 for emitting the fluorescence B in the blue wavelength band, the first light modulation element 30Y for modulating the fluorescence Y emitted from the first light source device 20, and the second light modulation element 30B for modulating the fluorescence B emitted from the second light source device 22. The light combining element 60 combines the yellow modulated light Y1 emitted from the first light modulation element 30Y and the blue modulated light B1 emitted from the second light modulation element 30B with each other.

According to this configuration, it is possible to enhance the color reproducibility of the image compared to the projector 10 according to the first embodiment which uses only the fluorescence Y emitted from the first light source device. Further, since the two sets of the light source devices are sufficient, and the two sets of the light modulation elements are sufficient, it is possible to realize the projector 15 having a simplified configuration compared to the projector 14 according to the fourth embodiment. When the first light modulation element 30Y is provided with the color filter of the two colors of red and green, it is possible to obtain a color image consisting of three colored light beams of red, green, and blue. When the first light modulation element 30Y is not provided with the color filter, it is possible to obtain a color image consisting of the two colored light beams of yellow and blue.

Sixth Embodiment

A sixth embodiment of the present disclosure will hereinafter be described using FIG. 15.

A basic configuration of a light source device provided to a projector according to the sixth embodiment is substantially the same as that in the first embodiment, and therefore, the description of the basic configuration of the light source device will be omitted.

Figure 15:
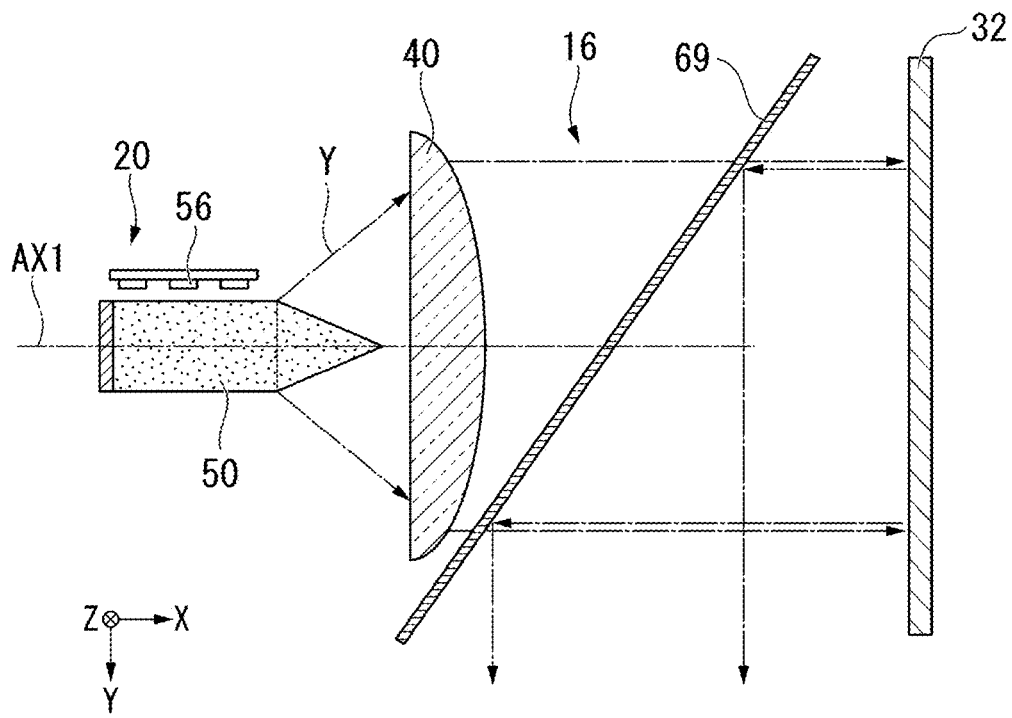
FIG. 15 is a schematic configuration diagram of a projector according to a sixth embodiment.

FIG. 15 is a schematic configuration diagram of the projector according to the sixth embodiment.

In FIG. 15, the constituents common to the drawings used in the previous embodiments are denoted by the same reference symbols, and the description thereof will be omitted.

As shown in FIG. 15, the projector 16 according to the present embodiment is provided with the first light source device 20, a light modulation element 32, a reflective polarization plate 69, and the angle conversion lens 40. The first light source device 20 is substantially the same as the light source device 20 in the first embodiment.

While in the first through fifth embodiments, the transmissive light modulation element is used as the light modulation element, a reflective light modulation element is used as the light modulation element in the present embodiment. The light modulation element 32 in the present embodiment is formed of, for example, a reflective liquid crystal panel called LCOS. The reflective liquid crystal panel has a common configuration, and therefore, the description thereof will be omitted.

The reflective polarization plate 69 is disposed between the angle conversion lens 40 and the light modulation element 32. The reflective polarization plate 69 is arranged so as to form an angle of, for example, 45° with respect to the optical axis AX1 of the first light source device 20. The reflective polarization plate 69 transmits first linearly polarized light having a predetermined polarization direction, and reflects second linearly polarized light having a polarization direction different from the polarization direction of the first linearly polarized light. By arranging the reflective polarization plate 69 of this kind between the angle conversion lens 40 and the light modulation element 32, it becomes possible to modulate the fluorescence Y emitted from the first light source device 20.

Advantages of Sixth Embodiment

Also in the present embodiment, it is possible to obtain substantially the same advantages as those of the first embodiment such as an advantage that it is possible to realize the focus-free projector 16 capable of projecting the image low in speckle noise.

In the projector 16 according to the present embodiment, the light modulation element 32 is formed of the reflective light modulation element.

According to this configuration, it is possible to increase the numerical aperture of each of the pixels of the light modulation element 32, and thus, it is possible to realize the projector 16 capable of projecting a bright image.

Seventh Embodiment

A seventh embodiment of the present disclosure will hereinafter be described using FIG. 16.

A basic configuration of a light source device provided to a projector according to the seventh embodiment is substantially the same as that in the first embodiment, and therefore, the description of the basic configuration of the light source device will be omitted.

Figure 16:
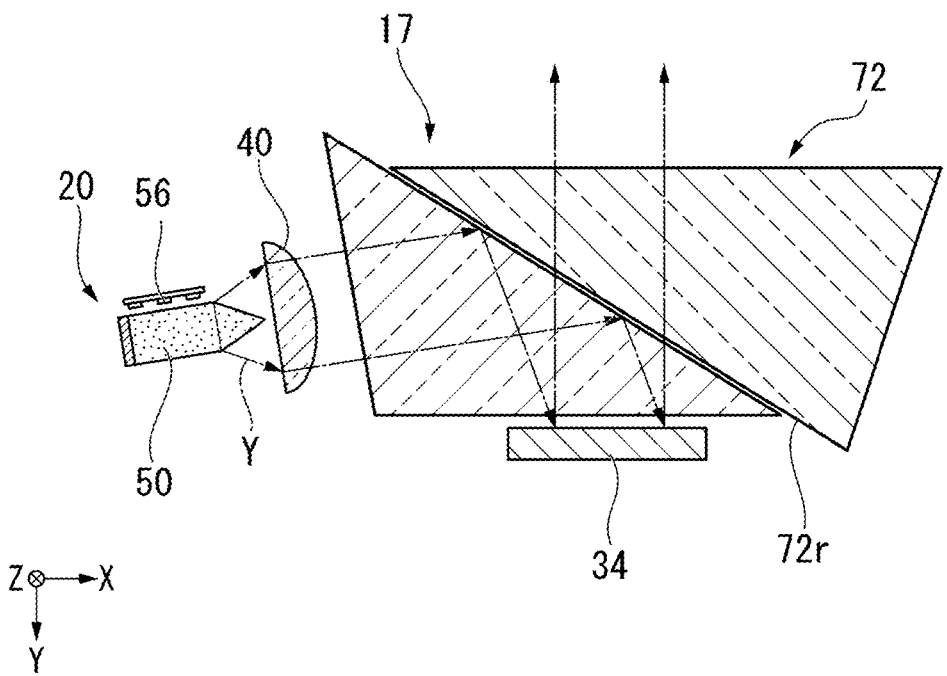
FIG. 16 is a schematic configuration diagram of a projector according to a seventh embodiment.

FIG. 16 is a schematic configuration diagram of a projector 17 according to the seventh embodiment.

In FIG. 16, the constituents common to the drawings used in the previous embodiments are denoted by the same reference symbols, and the description thereof will be omitted.

As shown in FIG. 16, the projector 17 according to the present embodiment is provided with the first light source device 20, a light modulation element 34, a total internal reflection prism (a TIR prism) 72, and the angle conversion lens 40. The first light source device 20 is substantially the same as the light source device 20 in the first embodiment.

While in the first through sixth embodiments, the liquid crystal panel is used as the light modulation element, a micromirror type light modulation element is used as the light modulation element in the present embodiment. The light modulation element 34 in the present embodiment is formed of, for example, a digital micromirror device (DMD). The DMD has a configuration having a plurality of micromirrors arranged in a matrix.

The total internal reflection prism 72 is constituted by two prisms arranged so as to be opposed to each other across an air layer having a constant thickness, and has a reflecting surface 72r. An angle of the reflecting surface 72r is set so as to totally reflect the fluorescence Y emitted from the first light source device 20 toward the light modulation element 34. The DMD switches the tilt directions of the plurality of micromirrors to thereby switch the reflection direction of the fluorescence Y between the direction in which the fluorescence Y is transmitted through the reflecting surface 72r and the direction in which the fluorescence Y is reflected by the reflecting surface 72r.

The angle conversion lens 40 is disposed between the first light source device 20 and the total internal reflection prism 72.

Advantages of Seventh Embodiment

Also in the present embodiment, it is possible to obtain substantially the same advantages as those of the first embodiment such as an advantage that it is possible to realize the focus-free projector 17 capable of projecting the image low in speckle noise.

It should be noted that the scope of the present disclosure is not limited to the embodiments described above, and a variety of modifications can be provided thereto within the scope or the spirit of the present disclosure. Further, one aspect of the present disclosure can be provided with a configuration obtained by arbitrarily combining characterizing portions of the respective embodiments described above with each other.

For example, in the embodiments described above, regarding the light source device provided with the wavelength conversion member for emitting the blue fluorescence, a light guide member which does not include the phosphor, and which guides the blue light having entered the light guide member without performing the wavelength conversion on the blue light can be used instead of the wavelength conversion member. Specifically, it is possible to adopt a configuration in which the blue light emitted from a blue LED is made to enter the light guide member from the other end via a diffused layer using the light guide member obtained by performing grinding processing on one end of, for example, a quadrangular prism so as to have a quadrangular pyramidal shape, and forming the diffused layer at the other end of the quadrangular prism. Also in this configuration, it is possible to realize the focus-free projector capable of projecting an image low in speckle noise.

In the embodiment described above, regarding the light source device provided with the wavelength conversion member for emitting the yellow fluorescence, it is possible to adopt a configuration in which a dichroic filter is arranged in a posterior stage of the light source device to take out either one of the green light component and the red light component from the yellow fluorescence to emit green or red fluorescence. Alternatively, it is possible to adopt a configuration in which a dichroic mirror is arranged in the posterior stage of the light source device to separate the green light component and the red light component from the yellow fluorescence to make each of the green light and the red light enter the light modulation element.

The angle conversion lens is arranged between the light source device and the light modulation element in the embodiments described above, but can be arranged in a posterior stage of the light modulation element. In other words, it is possible for the light modulation element to be arranged between the light source device and the angle conversion lens. According to this configuration, since the distance between the light source device and the light modulation element becomes shorter compared to a configuration in which the angle conversion lens is arranged between the light source device and the light modulation element, it is possible to reduce the light modulation element in size. Further, the number of the angle conversion lenses used is not limited to one, and can be two or more.

The quadrangular pyramidal shape is adopted as the shape of the exit part in the embodiments described above, but the second end part of the exit part is not required to be completely sharp, and can be a planar shape, or rounded to form a curved surface. According to these configurations, it is possible to reduce the possibility that the second end part is damaged in the manufacturing process of the light source device and so on. Further, since the fluorescence hardly reaches the tip of the second end part, even when the tip of the second end part is provided with a tiny plane or a tiny curved surface, there is little possibility that the extraction efficiency of the fluorescence decreases. Further, it is desirable for the shape of the exit part to be a quadrangular shape when the effective modulation area of the light modulation element has a quadrangular shape, but it is possible to adopt a conical shape, a polygonal pyramidal shape, and so on besides the quadrangular pyramidal shape. Even in this case, the reduction effect of the speckle noise can be obtained.

In the embodiments described above, although there are cited the examples of the transmissive liquid crystal panel, the reflective liquid crystal panel, the DMD, and so on as the light modulation element for performing the modulation based on the image information, there can be used a lantern slide (a positive film or a negative film) in which the projection image does not change with time, a sample on a mount, a viewgraph, a cutout for shadowgraph, and so on besides these light modulation elements. When the light modulation element of this kind is used, the projection image can be switched by arbitrarily replacing the light modulation element with light modulation elements having other patterns.

In the projector 10 according to the first embodiment described above, there is cited as an example when applying the light source device for emitting the yellow fluorescence Y as the first light source device 20, but the present disclosure is not limited thereto, and it is possible to replace the first light source device 20 with any one of the light source devices of emitting the red fluorescence R such as the first light source device 23, the blue fluorescence B such as the second light source device 22, and the green fluorescence G such as the third light source device 24.

Besides the above, the specific descriptions of the shape, the number, the arrangement, the material, and so on of the constituents of the light source device and the projector are not limited to those in the embodiments described above, and can arbitrarily be modified.

A projector according to an aspect of the present disclosure may have the following configuration.

The projector according to the aspect of the present disclosure, is a projector configured to project an image on a projection target in a focus-free state, including a first light source device, and a light modulation element configured to modulate light emitted from the first light source device, wherein the first light source device includes a light emitting element configured to emit first light having a first wavelength band, a wavelength conversion member which includes a phosphor, and which is configured to convert the first light emitted from the light emitting element into second light having a second wavelength band different from the first wavelength band, and an exit part which is disposed along a central axis of the wavelength conversion member, and which is configured to emit the second light generated by the wavelength conversion member, the exit part has a first end part opposed to the wavelength conversion member, a second end part located at an opposite side to the first end part along the central axis, and a taper part gradually decreasing in cross-sectional area perpendicular to the central axis in a direction from the first end part toward the second end part, and the taper part has a light exit surface which is tilted with respect to the central axis, and which is configured to emit the second light.

In the projector according to the aspect of the present disclosure, the wavelength conversion member may have a first face and a second face located at respective sides opposite to each other in a longitudinal direction of the wavelength conversion member, and a third face crossing the first face and the second face, the second light may be emitted from the first face toward the exit part, and the first light emitted from the light emitting element may enter the third face.

In the projector according to the aspect of the present disclosure, a shape of the first face may be a rectangular shape, and a shape of an effective modulation area of the light modulation element may be a rectangular shape.

In the projector according to the aspect of the present disclosure, a shape of the exit part may be a quadrangular pyramidal shape.

In the projector according to the aspect of the present disclosure, defining a length of the exit part along the longitudinal direction as H, and a length of the exit part along a direction crossing the longitudinal direction as L, a ratio H/L between H and L may be no lower than 1.3.

In the projector according to the aspect of the present disclosure, the wavelength conversion member and the exit part may be formed of an integrated member.

In the projector according to the aspect of the present disclosure, the exit part may be formed of a light transmissive member separated from the wavelength conversion member, and may be bonded to the wavelength conversion member.

The projector according to the aspect of the present disclosure may further be provided with an angle conversion lens configured to transmit the second light emitted from the exit part, wherein an emission angle of the second light emitted from the angle conversion lens may be smaller than an emission angle of the second light entering the angle conversion lens.

In the projector according to the aspect of the present disclosure, the angle conversion lens may be disposed between the first light source device and the light modulation element.

In the projector according to the aspect of the present disclosure, the angle conversion lens may be formed of an aspherical lens.

The projector according to the aspect of the present disclosure may further be provided with a second light source device configured to emit third light having a third wavelength band different from the first wavelength band and the second wavelength band, and a light combining element configured to combine the second light emitted from the first light source device and the third light emitted from the second light source device with each other to emit first composite light, wherein the light modulation element may be configured to modulate the first composite light emitted from the light combining element.

The projector according to the aspect of the present disclosure may further be provided with a third light source device configured to emit fourth light having a fourth wavelength band different from the first wavelength band, the second wavelength band, and the third wavelength band, wherein the light combining element is configured to combine the second light emitted from the first light source device, the third light emitted from the second light source device, and the fourth light emitted from the third light source device with each other to emit second composite light, and the light modulation element may be configured to modulate the second composite light emitted from the light combining element.

In the projector according to the aspect of the present disclosure, the light modulation element may include a color filter.

In the projector according to the aspect of the present disclosure, the first light source device, the second light source device, and the third light source device may be lit in a time-sequential manner, and the light modulation element may be driven in synchronization with respective lighting timing of the first light source device, the second light source device, and the third light source device.

The projector according to the aspect of the present disclosure may further be provided with a second light source device configured to emit third light having a third wavelength band different from the first wavelength band and the second wavelength band, and a light combining element, wherein the light modulation element may include a first light modulation element configured to modulate the second light emitted from the first light source device, and a second light modulation element configured to modulate the third light emitted from the second light source device, and the light combining element may be configured to combine first modulated light emitted from the first light modulation element and second modulated light emitted from the second light modulation element with each other.

The projector according to the aspect of the present disclosure may further be provided with a third light source device configured to emit fourth light having a fourth wavelength band different from the first wavelength band, the second wavelength band, and the third wavelength band, wherein the light modulation element may further include a third light modulation element configured to modulate the fourth light emitted from the third light source device, and the light combining element may be configured to combine the first modulated light, the second modulated light, and third modulated light emitted from the third light modulation element with each other.

In the projector according to the aspect of the present disclosure, the light modulation element may be formed of a transmissive light modulation element.

In the projector according to the aspect of the present disclosure, the light modulation element may be formed of a reflective light modulation element.

What is claimed is:

1. A projector configured to project an image on a projection target in a focus-free state, comprising:
   a first light source device; and
   a light modulation element configured to modulate light emitted from the first light source device, wherein
   the first light source device includes
     a light emitting element configured to emit first light having a first wavelength band,
     a wavelength conversion member which includes a phosphor, and which is configured to convert the first light emitted from the light emitting element into second light having a second wavelength band different from the first wavelength band, and
     an exit part which is disposed along a central axis of the wavelength conversion member, and which is configured to emit the second light generated by the wavelength conversion member,
   the exit part has a first end part opposed to the wavelength conversion member, a second end part located at an opposite side to the first end part along the central axis, and a taper part gradually decreasing in cross-sectional area perpendicular to the central axis in a direction from the first end part toward the second end part, and
   the taper part has a light exit surface which is tilted with respect to the central axis, and which is configured to emit the second light.

2. The projector according to claim 1, wherein
   the wavelength conversion member has a first face and a second face located at respective sides opposite to each other in a longitudinal direction of the wavelength conversion member, and a third face crossing the first face and the second face,
   the second light is emitted from the first face toward the exit part, and
   the first light emitted from the light emitting element enters the third face.

3. The projector according to claim 1, wherein
   a shape of the first face is a rectangular shape, and a shape of an effective modulation area of the light modulation element is a rectangular shape.

4. The projector according to claim 3, wherein
   a shape of the exit part is a quadrangular pyramidal shape.

5. The projector according to claim 2, wherein
   defining a length of the exit part along the longitudinal direction as H, and a length of the exit part along a direction crossing the longitudinal direction as L, a ratio H/L between H and L is no lower than 1.3.

6. The projector according to claim 1, wherein
   the wavelength conversion member and the exit part are formed of an integrated member.

7. The projector according to claim 1, wherein
   the exit part is formed of a light transmissive member separated from the wavelength conversion member, and is bonded to the wavelength conversion member.

8. The projector according to claim 1, further comprising:
   an angle conversion lens configured to transmit the second light emitted from the exit part, wherein
   an emission angle of the second light emitted from the angle conversion lens is smaller than an emission angle of the second light entering the angle conversion lens.

9. The projector according to claim 8, wherein
   the angle conversion lens is disposed between the first light source device and the light modulation element.

10. The projector according to claim 8, wherein
    the angle conversion lens is formed of an aspherical lens.

11. The projector according to claim 1, further comprising:
    a second light source device configured to emit third light having a third wavelength band different from the first wavelength band and the second wavelength band; and
    a light combining element configured to combine the second light emitted from the first light source device and the third light emitted from the second light source device with each other to emit first composite light, wherein the light modulation element is configured to modulate the first composite light emitted from the light combining element.

12. The projector according to claim 11, further comprising:
a third light source device configured to emit fourth light having a fourth wavelength band different from the first wavelength band, the second wavelength band, and the third wavelength band, wherein
the light combining element is configured to combine the second light emitted from the first light source device, the third light emitted from the second light source device, and the fourth light emitted from the third light source device with each other to emit second composite light, and
the light modulation element is configured to modulate the second composite light emitted from the light combining element.

13. The projector according to claim 12, wherein
the light modulation element includes a color filter.

14. The projector according to claim 12, wherein
the first light source device, the second light source device, and the third light source device are lit in a time-sequential manner, and
the light modulation element is driven in synchronization with respective lighting timing of the first light source device, the second light source device, and the third light source device.

15. The projector according to claim 1, further comprising:
a second light source device configured to emit third light having a third wavelength band different from the first wavelength band and the second wavelength band; and
a light combining element, wherein
the light modulation element includes a first light modulation element configured to modulate the second light emitted from the first light source device, and a second light modulation element configured to modulate the third light emitted from the second light source device, and
the light combining element is configured to combine first modulated light emitted from the first light modulation element and second modulated light emitted from the second light modulation element with each other.

16. The projector according to claim 15, further comprising:
a third light source device configured to emit fourth light having a fourth wavelength band different from the first wavelength band, the second wavelength band, and the third wavelength band, wherein
the light modulation element further includes a third light modulation element configured to modulate the fourth light emitted from the third light source device, and
the light combining element is configured to combine the first modulated light, the second modulated light, and third modulated light emitted from the third light modulation element with each other.

17. The projector according to claim 1, wherein
the light modulation element is formed of a transmissive light modulation element.

18. The projector according to claim 1, wherein
the light modulation element is formed of a reflective light modulation element.

* * * * *